US006311437B1

(12) United States Patent
Lorenz

(10) Patent No.: US 6,311,437 B1
(45) Date of Patent: Nov. 6, 2001

(54) PANE FOR SOLAR PROTECTION, DAYLIGHTING AND ENERGY CONSERVATION

(75) Inventor: Werner Lorenz, Ketteltasches Hof 12, 45289 Essen (DE)

(73) Assignee: Werner Lorenz, Essen (DE)

( * ) Notice: Subject to any disclaimer, the term of this patent is extended or adjusted under 35 U.S.C. 154(b) by 0 days.

(21) Appl. No.: 09/422,161

(22) Filed: Oct. 22, 1999

(51) Int. Cl.[7] ............................ E04D 13/18; G02B 17/00

(52) U.S. Cl. .......................... 52/173.3; 359/592; 359/593

(58) Field of Search .................................... 52/173.3, 200, 52/786.1, 18; 40/582; 359/591, 592, 595, 596, 597, 593

(56) References Cited

U.S. PATENT DOCUMENTS

| | | | | |
|---|---|---|---|---|
| 982,772 | * | 1/1911 | Wadsworth | 359/593 |
| 2,714,816 | * | 8/1955 | Pennell | 359/592 |
| 3,257,486 | * | 6/1966 | Luboshez | 359/596 X |
| 3,603,670 | * | 9/1971 | Kim | 359/593 |
| 4,357,074 | * | 11/1982 | Nardini | 359/592 |
| 4,498,455 | * | 2/1985 | Gramm | 359/596 X |
| 4,890,900 | * | 1/1990 | Walsh | 52/18 X |

FOREIGN PATENT DOCUMENTS

| | | | | |
|---|---|---|---|---|
| 1472508 | * | 1/1969 | (DE) | 359/591 |
| 092322 | * | 10/1983 | (EP) . | |
| 0823645 | | 2/1998 | (EP) . | |
| 2463254 | * | 3/1981 | (FR) . | |
| WO 94/25792 | | 5/1994 | (WO) . | |

OTHER PUBLICATIONS

Edmonds, I. R., "Performance of Laser Cut, Light Deflecting Panels in Daylighting Applications", Solar Energy Materials and Solar Cells, 1993, 7–26, 29, Elsevier.

Köster, H., "Intelligent Building" Durch Verbesserte Tageslichtnutzung, Licht und Architektur (DBZ), 1992, 2, 81–86, Germany.

Moeck, M., "On Daylight Quality and Quantity and Its Application to Advanced Daylight Systems", Journal Illuminating Engineering Society, Winter 1998, 3–21.

Aizlewood, H. E., "Innovative Daulighting Systems: An Experimental Evaluation", Lighting Reserch and Technology, 1993, 141–152, 25.

Bartenbach, C., "Neue Tageslichtkonzepte," Technik Am Bau, 1986, 4, Germany.

Ruck, N. G., "Beaming Daylight Into Deep Rooms," Building Res. Pract., 1985, 144–147, 6.

Beltran, L. O., Lee, E. S., Selkowitz, S. E., "Advanced Optical Daylighting Systems: Light Shelves and Light Pipes", Journal Illuminating Engineering Society, Winter 1997, 91–106.

* cited by examiner

*Primary Examiner*—Peter R. Brown
*Assistant Examiner*—James O. Hansen

(57) ABSTRACT

The pane for solar protection, daylighting and energy conservation is a pane system consisting of two prismatic panes. The prismatic ribs of the panes are inclined by a certain angle to the horizontal within the window plane, exhibit identical cross-sections in the shape of a rectangular triangle with a certain basic prism angle θ, are facing each other and are engaged such that just a small gap remains between both of the panes. The faces $s_A$ of the prismatic ribs are coated with a specularly reflecting layer and the faces $s_B$ of the prismatic ribs are coated with a diffusely reflecting layer.

The prismatic pane system can be applied for common window inclination angles v and for window directions with essential solar irradiation at sites of temperate climate. It does not essentially reduce the view to the outside, achieves—in comparison to other window panes—a relatively uniform illumination of a room with daylight and during the summer and the transition periods an improved protection from solar irradiation and distinctly reduced irradiated heat quantities. The reflecting faces of the prismatic ribs do not create a glare effect.

6 Claims, 26 Drawing Sheets

PANE FOR SOLAR PROTECTION, DAYLIGHTING AND ENERGY CONSERVATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE INVENTION

Not applicable

BACKGROUND OF THE INVENTION

Panes with Horizontal Prismatic Ribs

Panes with horizontal prismatic ribs for vertical windows which are directed to the south and which reject or transmit direct solar radiation depending on the actual solar elevation angle are known since 1980 (French patent application no. 8017364, publication no. 2463254). Adequate dimensioning of the cross-section of the rib (FIG. 1) causes the refraction of rays when penetrating the upper surface of the ribs and then—in case—the total internal reflection of rays at the rear surface of the pane in such a way that the direct solar radiation is rejected in summer and transmitted in winter. The basic prism angle θ is determined such that the equation $$\sin(\eta_G-\theta)=n\cdot\sin(\kappa-\theta) \qquad (1)$$

with n: the refractive index of the pane material which is about 1.5 for common mon window glass and for acrylic glass,

- $\eta_G$: the chosen limiting value of the solar elevation angle $\eta_S$ at 12 o'clock local time—i.e. the solar rays impinging at an angle $\eta_S<\eta_G$ are to be rejected and those impinging at an angle $\eta_S<\eta_G$ are to be transmitted—and
- κ=arcsin(1/n), the critical angle of total reflection, holds. If the window with the prismatic pane is directed to the south, the vector of solar radiation at the local time $t_v$=12 o'clock is located within the cross-sectional planes of the ribs, is perpendicular to the longitudinal axes of the ribs and the horizontal prismatic ribs are parallel to the equator plane. Therefore, the direction of the prismatic pane to the south has the consequence that the functional dependency on local time of the incident angle $\gamma_2$ of the rays impinging on the rear surface of the pane—$\gamma_2$ being decisive for reflection or transmission—is symmetrical to the local time $t_v$=12 o'clock. For radiation which is irradiated with identical incident angles from the clear or the overcast sky this reflective property of the prismatic ribs is, of course, the same as for radiation incident from the sun. In summer time, therefore, the room temperatures remain in acceptable limits, whereas in winter time the energy of solar radiation contributes to the reduction of heating energy. However, this prismatic pane offers no clear view and is applicable for vertical windows only which are essentially directed to the south. In comparison to common glass panes this prismatic pane offers a better protection from glare of direct solar radiation at locations in the vicinity of a window, but does not achieve an improved daylighting of the deeper parts of a room.

Panes with Non-Horizontal Prismatic Ribs

A later development (European patent application no. 97113294.9-2205) describes, how panes with prismatic ribs may achieve this performance for all vertical windows with a direction between southeast by east and southwest by west. This is accomplished by prismatic ribs which are declined—depending on the deviation Δβ of the window direction from the south—by a certain angle α to the horizontal plane. The angle α is determined by the $$\tan\alpha=-\sin\Delta\beta/\tan\lambda \qquad (2)$$

with λ: the geographical latitude of the application site.

For a variety of window directions the declination of the prismatic ribs relative to the horizontal plane is presented in FIG. 2. The angle η is generally defined as the angle between the directional component of a ray within the cross-sectional plane of the rib and the intersecting straight line between the horizontal plane and the cross-sectional plane of the rib. The limiting angle $\eta_G$ between the vector of solar radiation and the intersecting straight line between the horizontal plane and the cross-sectional plane of the rib is determined for the daytime angle $\beta_v$ with the aid of the equations $$\delta_G=\delta_0\cdot\cos(2\pi\cdot d_G/d_J), \qquad (3)$$

the limiting angle of the solar declination relative to the equator plane at the times of the year, when there is just no solar radiation to be transmitted anymore or, respectively, when there is just solar radiation to be transmitted again by the prismatic pane, with

- δ: the angle of solar declination relative to the equator,
- $\delta_0$=23.45°, the maximum angle of solar declination relative to the equator at the annual time of summer solstice,
- $d_J$=365.25 days, the period of a year, $$\beta_v=-\arctan(\tan\Delta\beta/\sin\lambda), \qquad (4)$$

the daytime angle at which the vector of solar radiation is within the cross-sectional planes of the ribs and is perpendicular to the longitudinal axes of the ribs, with

- t: the mean local daytime,
- β=π/12h·t: the daytime angle, $$\eta_0=-\arcsin(\cos\beta_v\cdot\cos\lambda\cos\alpha), \qquad (5)$$

the angle between the vector of solar radiation and the intersecting straight line between the horizontal plane and the cross-sectional plane of the rib for the daytime angle $\beta_v$ and the solar declination angle δ=0° and $$\eta_G=\delta_G+\eta_0. \qquad (6)$$

The basic prism angle θ is calculated from the equation $$\tan\theta=(1-\sin\eta_G)/[(n^2-1)^{1/2}-\cos\eta_G]. \qquad (7)$$

Eqn. 7 is an explicit form of eqn. 1. The maximum possible angle η between the vector of solar radiation and the intersecting straight line between the horizontal plane and the cross-sectional plane of the rib for daytime angle $\beta_v$ at the annual time of summer solstice is $$\eta_M=\delta_0+\eta_0. \qquad (8)$$

The angle Ω of the cross-section of the ribs is determined such that $$\Omega\geqq\pi/2-\eta_G \qquad (9)$$

holds. If $$\Omega \geqq \pi/2-\theta-\arcsin[\sin(\eta_M-\eta)/n]$$

is valid, which is true for great deviations of the window direction from the south and/or great solar radiation blockade periods, a saw tooth profile with specific angles is provided for the lower faces of the prismatic ribs (FIG. 3). For a correspondingly dimensioned prismatic pane the functional dependence on daytime of the solar incident angle $\gamma_2$ at the rear face of the prismatic pane which is decisive for reflection or transmission is symmetrical to the daytime $t_v$, has a minimum at this daytime and the level of the angle values increases with the annual time approaching summer solstice. This functional dependence on daytime of the solar incident angle $\gamma_2$ is presented for an example ($\Delta\beta=45°$, $\delta_G=11.725°$, $\alpha=-30.68°$, $\theta=47.87°$, $\beta_v=127.45°$ or, respectively, $t_v=8:30$) in FIG. 4. It can be recognized that at the two days of the annual times with the limiting solar declination angle $\delta_G$ just no solar ray can penetrate the prismatic pane and that the solar radiation blocking effect of the prismatic pane is vanishing more and more with a decreasing solar declination angle $\delta$. As, of course, the radiation blocking effect of the prismatic pane holds for solar radiation as well as for radiation incident from the sky, the part of the sky radiation for which $\gamma_2>\kappa$ holds cannot penetrate, too. Therefore, this prismatic pane offers the protection from solar radiation and the energetic advantages of the prismatic pane described in the French patent application no. 8017364 for a wide range of window directions and, moreover, enables the individual choice of the annual solar radiation blockade time by adequate dimensioning of the prismatic ribs. However, this prismatic pane offers no clear view, too, and is applicable for vertical windows only. In comparison to common glass panes also this prismatic pane offers better protection from glare of direct solar radiation at locations in the vicinity of a window, but does not achieve an improved daylighting of the deeper parts of a room. The manufacturing costs of the pane increase considerably, if a saw tooth profile turns out to be necessary.

Panes with Horizontal Incisions or Cavities

Moreover a pane for vertical windows the optical effective part of which consists of horizontal ribs vertically positioned one above another is known (Edmonds I. R., 1993. Performance of laser cut light deflecting panels in daylighting applications. *Solar Energy Materials and Solar Cells* 29, 1–26). This system can be manufactured, for instance, from acrylic glass panes in which narrow, parallel grooves—possibly employing Laser beams—have been cut. (FIG. 5). The cross-sections of these ribs can have the shape of a rectangle or of a parallelogram not essentially deviating from a rectangle with an aspect ratio h/b.

After intruding into a rib a ray will leave the rib again at the rear face after none, one or more reflections depending on the point of impact, the angle $\eta$ of the ray, the aspect ratio h/b and the shape of the rib cross-section. FIG. 6 presents an example of three possible ray traces within the cross-sectional plane of the rib for three different angles $\eta$. It can be recognized that a part of the rays—depending on the angle $\eta$—receives a new, ascending direction, whereas the remaining part of the rays keep their former direction. Actually the part of the rays with new, ascending direction varies in dependence on the direction of the impinging radiation from 0 to 1; this holds too, if the cross-sectional plane of the rib is a parallelogram. In spite of the directional dependency of the ray directing function this system directs a considerable part of the radiation incident from a clear or overcast sky on ascending traces against the usually white ceiling of a room and improves the daylighting of deep rooms in this way. However, direct solar radiation which, of course, at a discrete daytime is incident just from one direction will generate—depending on daytime and annual time—very different and quickly varying daylighting situations and ray directions in rooms equipped with this pane system and disturbing glare effects will occur. Therefore, this system—even with an adequate coating—is not qualified as pane protecting from solar radiation and it offers—in comparison to common glass panes—no capability to control the heat irradiation in summer and in winter. For vertical windows, however, which are essentially directed to the north—on the southern hemisphere: to the south—this system which also permits an acceptable clear view is qualified for the improved daylighting of deep rooms. At application locations in the vicinity of the equator this system applied as a pyramidal ceiling daylight aperture in comparison to a corresponding ceiling daylight aperture with common glass panes is as well capable to effectively reduce the heat irradiation into a room as to improve the daylighting of a room.

Panes with Horizontal, Specular Profile Bars

The German patent application DE A1 E04D003-35 describes a pane which uses horizontal, specular profile bars in the intermediate space between the two panes of a pane system (FIG. 7) in order to reject direct solar radiation during summer time and to transmit direct solar radiation—directed into ascending directions—into the room during winter time. Correspondingly the radiation incident from the overcast or clear sky with low to mean declination angles is transmitted into the room, whereas the radiation incident from the overcast or clear sky with mean to high declination angles is rejected. This pane, therefore, has the aim to control the heat irradiation in such a manner that in summer as little energy as possible and in winter as much energy as possible can intrude into the room, and—in comparison to common panes—to accomplish an improved daylighting of deep rooms by directing the incident light against the usually white room ceilings. With the aid of the RADIANCE computer program this system has been simulated for a test room with a window directed to the south (Moeck M., 1998. On daylight quality and quantity and its application to advanced daylight systems. *Journal of the Illuminating Engineering Society Winter* 1998, 3–21) and, moreover, has been experimentally investigated tigated (Aizlewood M. E., 1993. Innovative Daylighting Systems: An experimental evaluation. *Lighting Research and Technology* 25, 141–152) and has been compared to other systems. It was found that this system—disregarding potential glare effects—can provide the required protection from solar radiation and can contribute to the equalization of daylighting in deep rooms. But as this system does not only strongly reduce the intrusion of light and energy in summer but also in winter, for each application it has to be estimated, if this system performs the required energy effect. To a certain extent this system provides a clear view. As the profile bars, however, require a larger part of the clear window area than the segments of a common Venetian blind, the clear view provided by this system is less than that provided by a window with a common Venetian blind. Because of the exclusively horizontally aligned profile bars this system as well as the already discussed prismatic pane corresponding to the French patent application no. 8017364 is suited for windows essentially directed to the south only. If the sky is clear and there is direct solar radiation, glare effects changing with daytime from the specular reflecting profile bars have to be expected.

Solar Radiation and Light Control Systems for Vertical Windows

Furthermore a non-movable prismatic pane system (FIG. 8) is known (Bartenbach, C., 1986. Neue Tageslicht-konzepte. *Technik am Bau* 4, Germany) which consists of two prismatic panes and one interior mirror. Both prismatic panes and the interior mirror are built together such that they form a space with an isosceles cross-section. The prismatic pane protruding to the outside is to reflect the direct solar radiation which can impinge up to a maximum solar elevation angle and to transmit the intensive radiation from the zenith range of the sky to the interior mirror. The transmitted radiation is directed by the interior mirror to the second prismatic pane which has the task to direct the radiation upward against the white ceiling of the room and, thus, to generate—as far as possible—a uniform, non-blinding day-lighting of deep rooms. In order to be able to fulfil this task one face of the prismatic ribs of each of these panes is coated with an evaporated, specular reflecting layer of aluminum. This system, too, was analyzed with the aid of the computer program RADIANCE for a test room with a window directed to the south (Moeck M., 1998. On daylight quality and quantity and its application to advanced daylight systems. *Journal of the Illuminating Engineering Society Winter* 1998, 3–21). It was found out that this system can provide the required, nearly perfect protection from solar radiation and that it avoids glare effects from direct solar light. But obviously it does not contribute to equalize the daylighting of deep rooms. As well in summer as in winter it essentially reduces the light and energy input into rooms, so that this system works rather uniformly in summer and in winter—i.e. without a significant, seasonal dependent control effect—as a light and energy dimming system. This system does not provide a clear view. Therefore and because of the externally protruding prismatic pane it is mainly suited as a skylight in combination with a common, clear-view, solar radiation restraining pane arranged below of it. Because of the exclusively horizontally aligned prismatic ribs this system as well as the systems already described above is suited for windows essentially directed to the south only.

Two further systems (Ruck N. G.,1985. Beaming daylight into deep rooms. *Building Res. Pract.* 6, 144–147 and, respectively, Beltran L. O., Lee E. S., Selkowitz S. E., 1997. Advanced optical daylighting systems: Light shelves and light pipes. *Journal of the Illuminating Engineering Society* Winter 1997, 91–106) have been designed which—similar to the system of Bartenbach described herein—have the task to direct daylight with an upper, vertical window part—called skylight—into the deeper ranges of rooms, in particular against the ceiling. In contrary to the system of Bartenbach these systems, however, aim for the use of the direct solar light for the daylighting of rooms; they are rather complex and expensive and contain parts which protrude beyond the vertical facades of buildings. Systems of this kind, therefore, have a strong influence on the facade of a building and thus restrict the creative design of architects.

Two Vertical Panes with Engaged, Horizontal Prismatic Ribs

Furthermore there is known a system (European patent application 833 01687.6, publication 0092322 A1) which consists of two panes with horizontal prismatic ribs (FIG. 9). The prismatic ribs of both panes all of which have identical cross-sections in the shape of a rectangular triangle are facing each other and are engaged such that just a small gap remains between both of the panes. The so-called "characteristical" cross-section of the prismatic ribs is determined by the basic prism angle θ and the faces $C_A$, $f_A$ and $S_A$ (FIG. 10). The characteristical cross-section of the prismatic ribs can be employed as a substitute of the actual configuration for the investigation of ray traces, as the parallel shift of the front face $a_A$ causes just an insignificant parallel shift of the ray trace. The blockade effect of the system for rays within the cross-sectional plane holds for the range between the limiting angles $$\eta_{Go}=\arcsin[n\cdot\sin(\theta-\kappa)] \tag{10}$$

and $$\eta_{Gu}=-\arcsin[n\cdot\cos(\theta+\kappa)], \tag{11}$$

as far as the rays intrude into the characteristical cross-section within a certain range indicated by the partial face $C_R$ in FIG. 10. A major part of the radiation, however, intrudes beyond of this range into the characteristical cross-section, is reflected at the rear face $f_A$, impinges again on the front face $a_A$—in FIG. 10 substituted by the face $c_A$—and is reflected thereon and impinges by such a steep incident angle on the rear face $s_A$ that this face is penetrated by the radiation. If little reflection losses at the faces are neglected, the ratio of the reflected radiation and the total radiation which is incident on the face $c_A$ with an angle η within the range $\eta_{Go}>\eta>\eta_{Gu}$ is $$C_R/C_A=2\cdot\cos(\theta-\eta_1)\cdot\cos\theta/\cos\eta_1 \tag{12}$$

with $\sin\eta_1=1/n\cdot\sin\eta$, if the radiation is parallel incident to the cross-sectional plane.

The ratio of the transmitted radiation and the total incident radiation $1-C_R/C_A$ for θ=76° in dependence on the angle $\eta_1$ is presented in FIG. 11. It can be recognized that radiation with angles from $\eta_1=0°$ to $\eta_{1Gu}=27.8°$ can penetrate completely; within this angular range the system provides a clear view. Radiation with angles from $\eta_{1Go}=34.17°$ to $\eta_1=41.81°$ can—disregarding reflection losses—penetrate completely as well, but the system does not provide a clear view within this angular range. Within the angular range $27.8°<\eta_1<34.17°$, however, more than half of the radiation penetrates. In opposition to the systems already described this system thus has the advantage that it provides a clear view within the lower angular ranges, but the disadvantage that the radiation within the mean and the upper angular ranges is not satisfactorily or not at all reflected. Therefore, the effect protecting from solar radiation of this system is insufficient. In the international patent application PCT/GB94/00949, publication WO 94/25792, a similar system is described.

BRIEF SUMMARY OF THE INVENTION

The new prismatic pane system is qualified for window inclinations from 45° to 90°, for window directions which may deviate up to 75° from the south on the northern hemisphere or, respectively, from the north on the southern hemisphere and for application locations between 30° and 60° northern or southern latitude. In summer it provides a superior protection from solar radiation and glare. External Venetian blinds or other complex external systems protecting from solar radiation which, for instance, in case of the application of common panes protecting from solar radiation are additionally necessary for the protection of working areas in the vicinity of windows from direct solar radiation are not required, if the prismatic pane system is applied.

The direct solar radiation penetrates the system in winter in a high degree—during during the transition periods in a degree depending on the annual time—mainly without changing the direction. If the potential glare effect should be disturbing, curtains or internal Venetian blinds which do not prevent the heat input desired during the colder time of a year are sufficient as a remedy.

The specular reflecting faces of the ribs do not cause a glare effect. A little part of the radiation incident by flat angles relative to the horizontal plane is reflected at this face, is directed in a steep angle against the room ceiling and, thus, contributes to a better daylighting of the room. Likewise the diffuse reflecting faces of the ribs do not cause a glare effect. However, they cause the window to appear luminous to the spectator within the room and contribute to a better daylighting of the room, too.

In comparison to common glass panes and common panes protecting from solar radiation the prismatic pane system leads to an equalizing daylighting of a room. In the vicinity of a window the prismatic pane system provides for otherwise identical conditions lower—for direct solar irradiation much lower—illumination than common glass panes or common panes protecting from solar radiation, whereas the illumination for increasing deepness of the room achieved by the prismatic pane system approximates to the illumination achieved by common glass panes.

The view to the outside is not essentially limited by the prismatic pane system. Of course, the spectator in the room observes parallel, white stripes within the window, but his view is not reduced for the interesting directions, as the stripes within the window appear to be very thin for horizontal directions and nearly disappear for slightly descending directions.

In comparison to common glass panes and common panes protecting from solar radiation the energetic advantages of the prismatic pane system are evident. This particularly holds for the considerably reduced heat irradiation during the summer and the transition periods. As far as no air conditioning system is employed, the prismatic pane system in comparison to common glass panes and common panes protecting from solar radiation provides an important improvement of the thermal comfort during the summer and the transition periods. For some buildings the application of the prismatic pane system will allow the renunciation of an air conditioning system or, respectively, the substitution of an air conditioning system by an air circulating system. Exemplary computations of the simultaneous application of the prismatic pane system and an air conditioning system for a building—in particular for buildings with large window areas—demonstrate that the additional expenses for the equipment of a building with prismatic panes in comparison to the equipment with common glass panes or common panes protecting from solar radiation are rather rapidly compensated by the lower costs of a smaller air conditioning system and by the reduced energy costs.

BRIEF DESCRIPTION OF THE SEVERAL VIEWS OF THE DRAWING

FIG. 32 presents constructive details of design a

DETAILED DESCRIPTION OF THE INVENTION

The Task of the Pane in the Sense of the Invention

The invention refers to a pane which is to provide superior protection from solar radiation and glare during the whole day in summer, energy saving properties in summer and winter, a good daylighting of the depths of rooms and a scarcely reduced view field for the view from the inside to the outside for a wide range of window directions which may deviate up to 75° from the south on the northern hemisphere or, respectively, from the north on the southern hemisphere, for window inclination angles from 45° to 90° relative to the horizontal plane and for temperate climate zones of the earth between 30° and 60° of northern and southern geographical latitude.

Theoretical Basis of the New Pane

Figure 1:
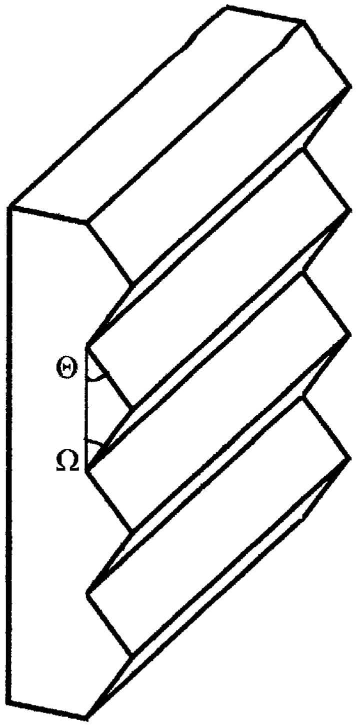
FIG. 1 (Prior Art)
FIG. 1 is a perspective view of a prismatic pane.
Figure 2:
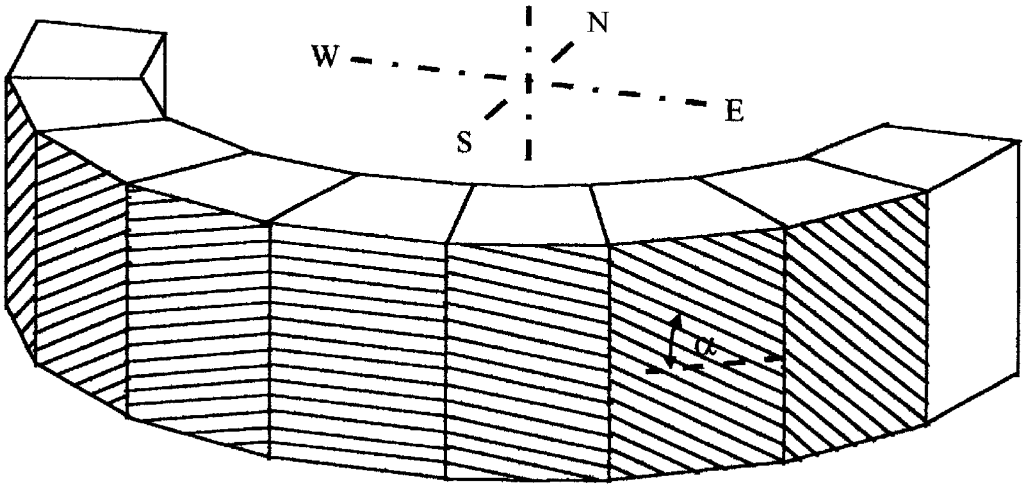
FIG. 2 (Prior Art)
FIG. 2 gives an impression of the inclination angle $\alpha$ of the prismatic ribs relative to the horizontal within the window plane for different window directions.
Figure 3:
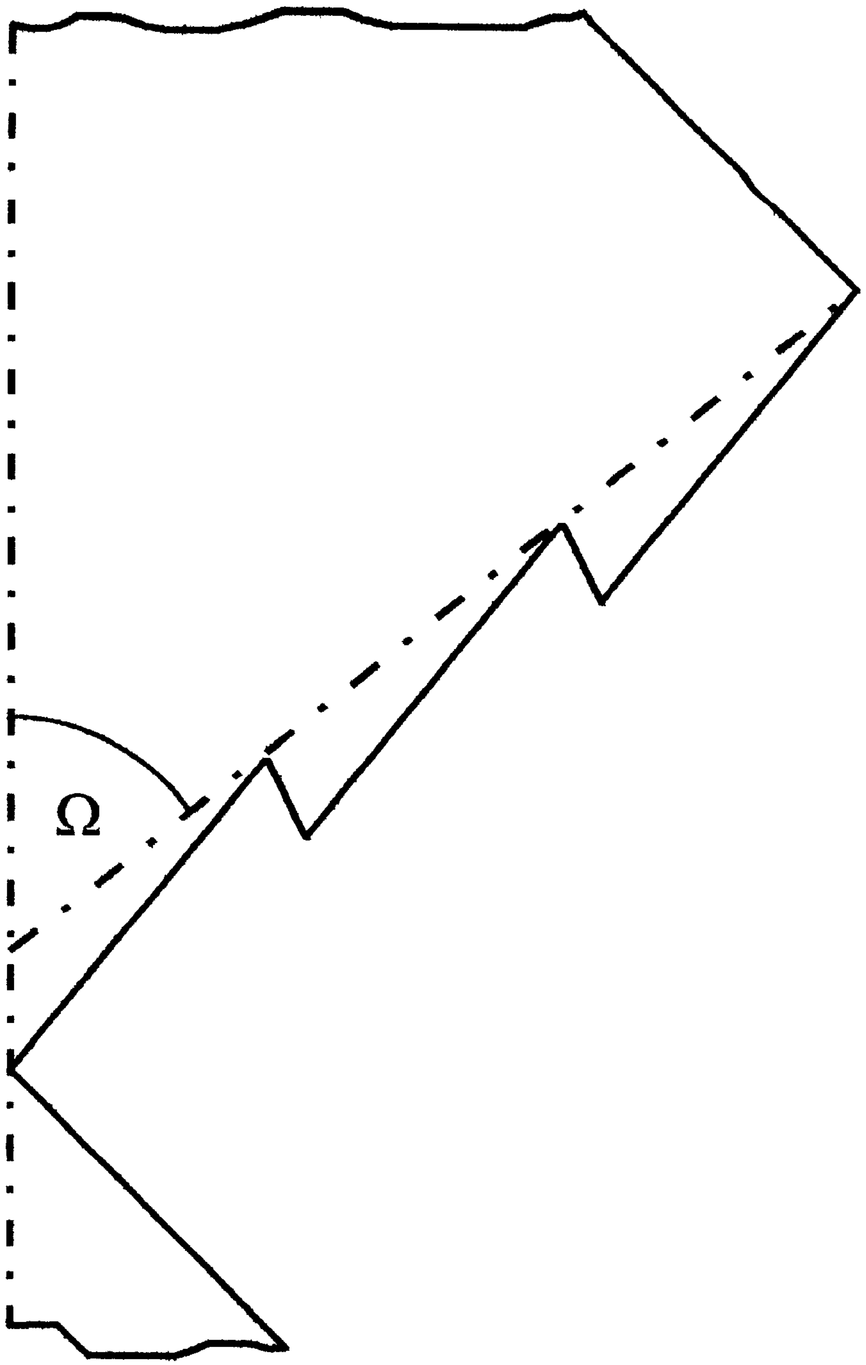
FIG. 3 (Prior Art)
FIG. 3 presents the saw tooth profile on the lower face of the prismatic rib.
Figure 4:
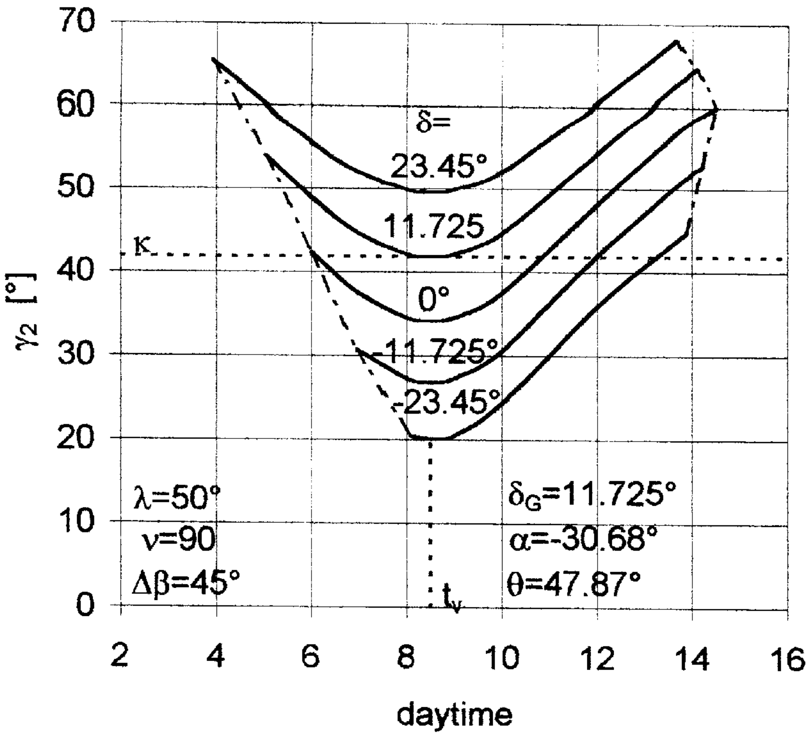
FIG. 4 (Prior Art)
FIG. 4 is a diagram presenting the incident angle $\gamma_2$ of a solar ray on the plane rear side of a prismatic pane.
Figure 5:
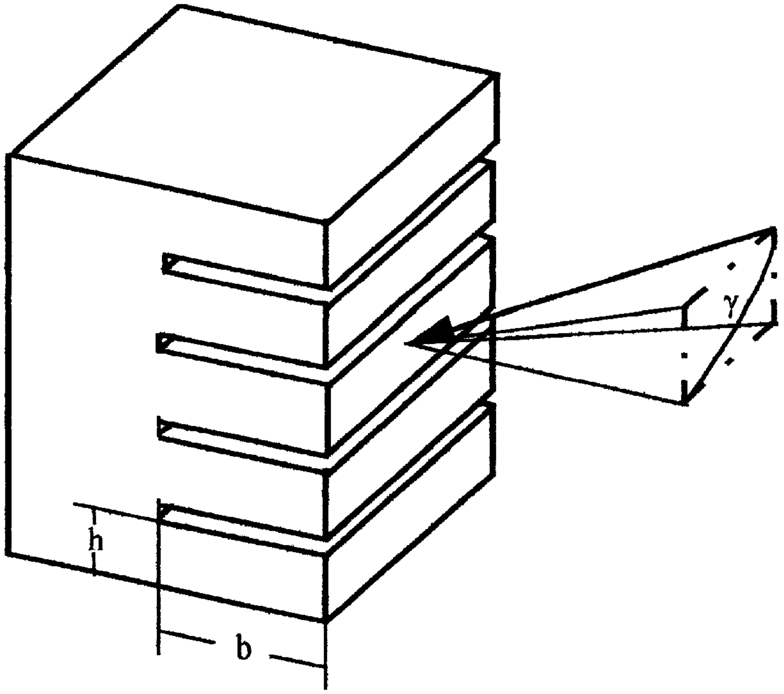
FIG. 5 (Prior Art)
FIG. 5 is a perspective view of an enlarged part of a pane with horizontal incisions for the direction of incident daylight against the room ceiling.
Figure 6:
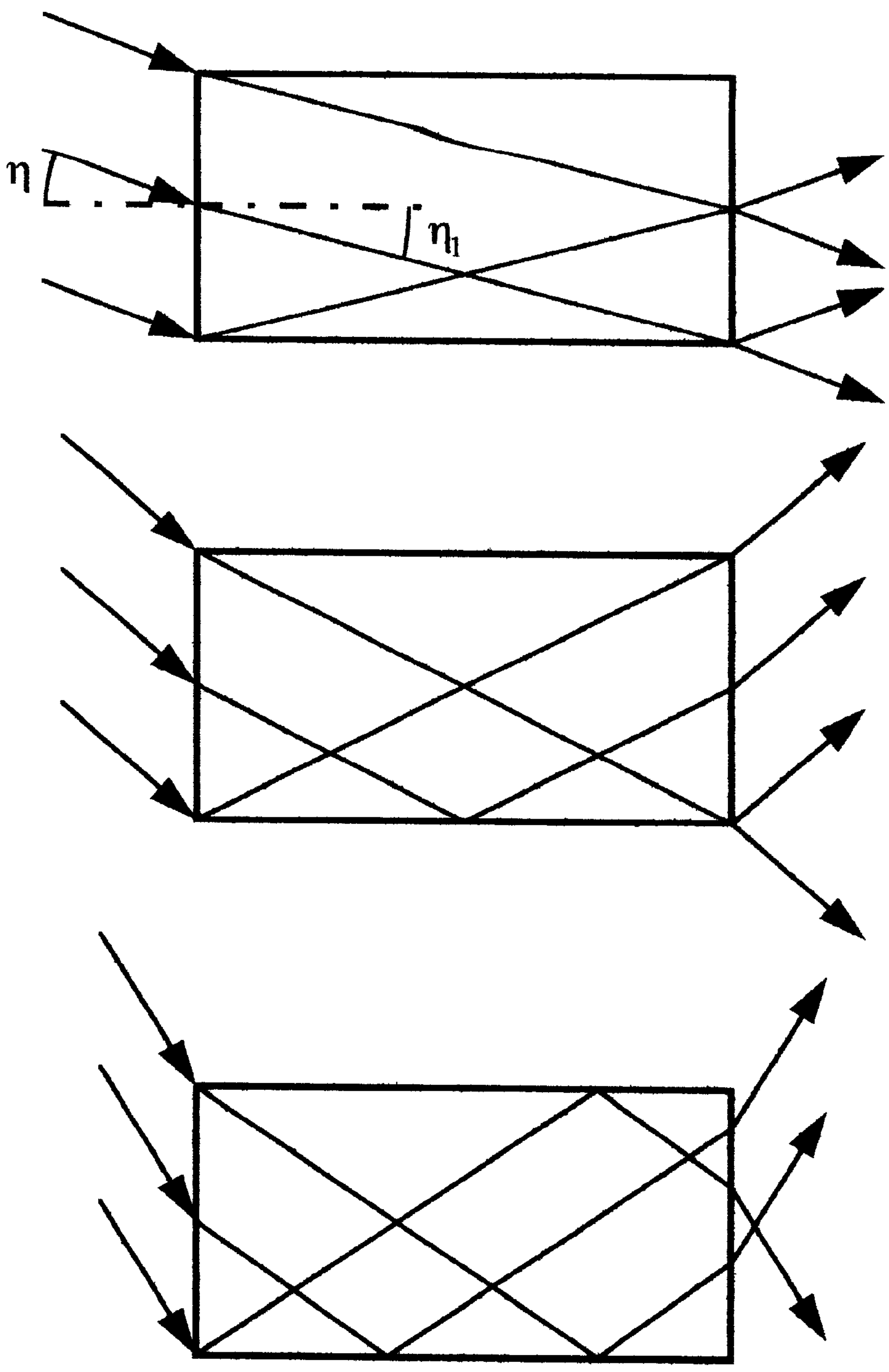
FIG. 6 (Prior Art)
FIG. 6 shows potential ray traces within the glass ribs with rectangular cross-section.
Figure 7:
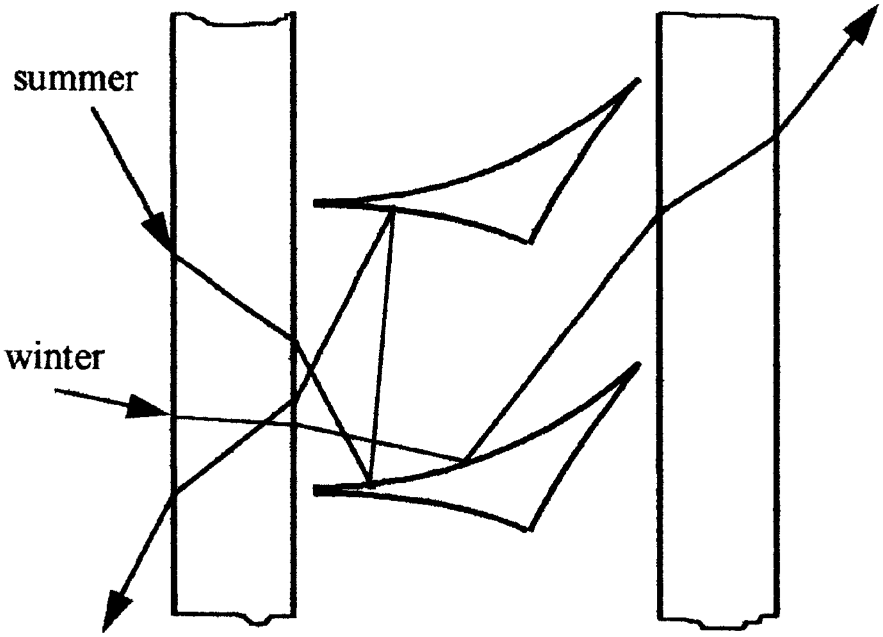
FIG. 7 (Prior Art)
FIG. 7 shows the traces of solar rays in summer and in winter within a pane system with horizontal, specularly reflecting profile bars within the intermediate space between two panes.
Figure 8:
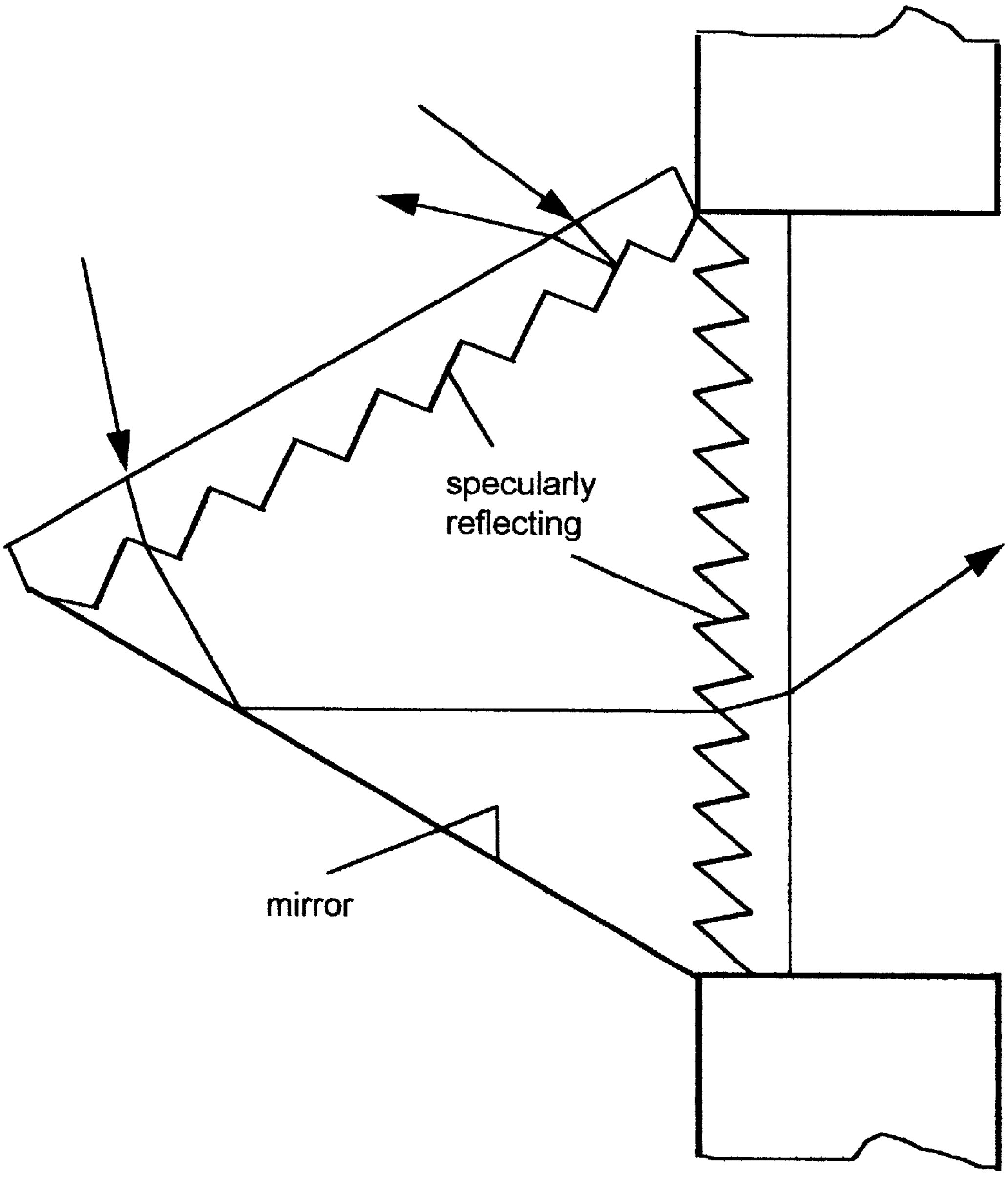
FIG. 8 (Prior Art)
FIG. 8 depicts the principle of a skylight system for the reception and the direction of steeply incident zenith light and for the rejection of less steeply incident solar radiation.
Figure 9:
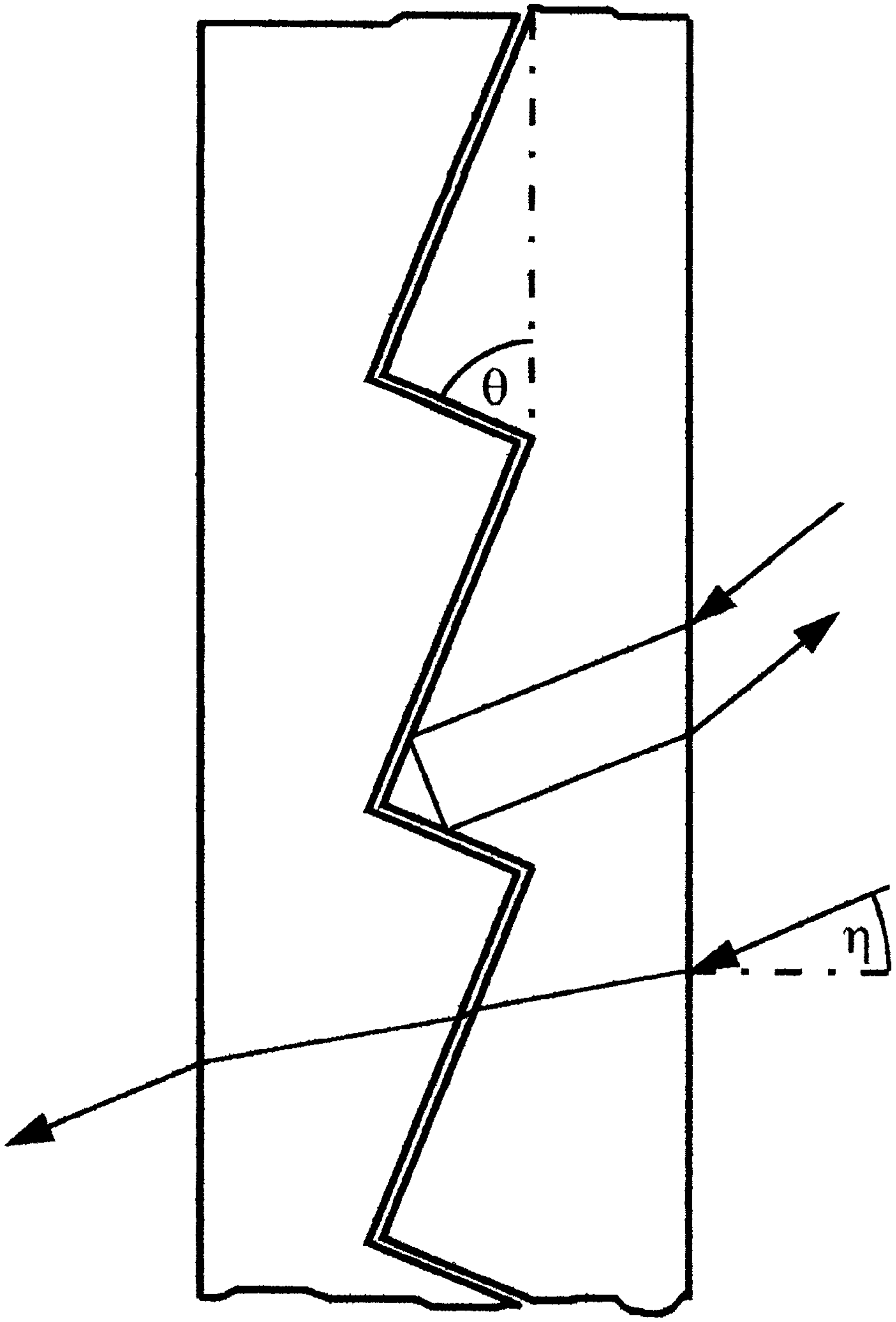
FIG. 9 (Prior Art)
FIG. 9 presents a system of two vertical panes with engaged, horizontal prismatic ribs.
Figure 10:
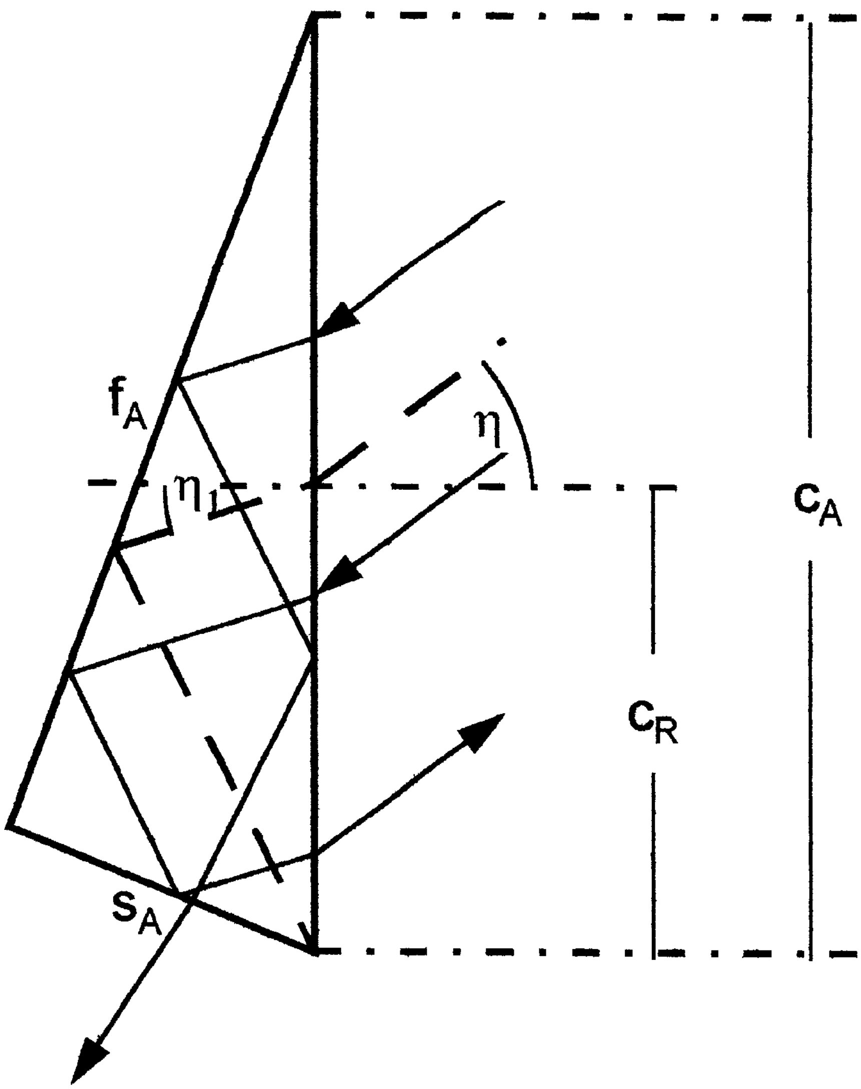
FIG. 10 (Prior Art)
FIG. 10 shows two parallel rays which—depending on the point of impingement—are rejected or, respectively, penetrate the characteristical prismatic rib.
Figure 11:
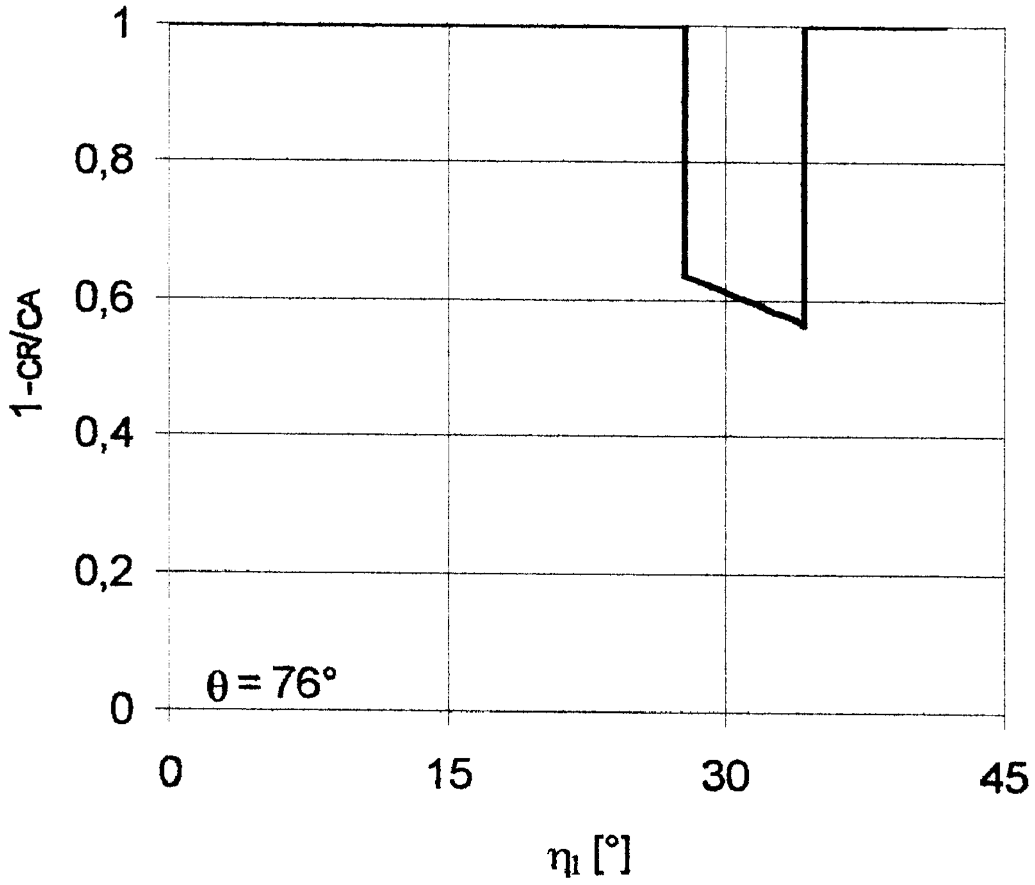
FIG. 11 (Prior Art)
FIG. 11 is a diagram presenting the fraction $1-C_R/C_A$ of the total radiation intruding with a rib elevation angle $\zeta_1$ which penetrates the characteristical prismatic rib with a basic prism angle $\theta=76°$ in dependence on the rib elevation angle $\zeta_1$.
Figure 12:
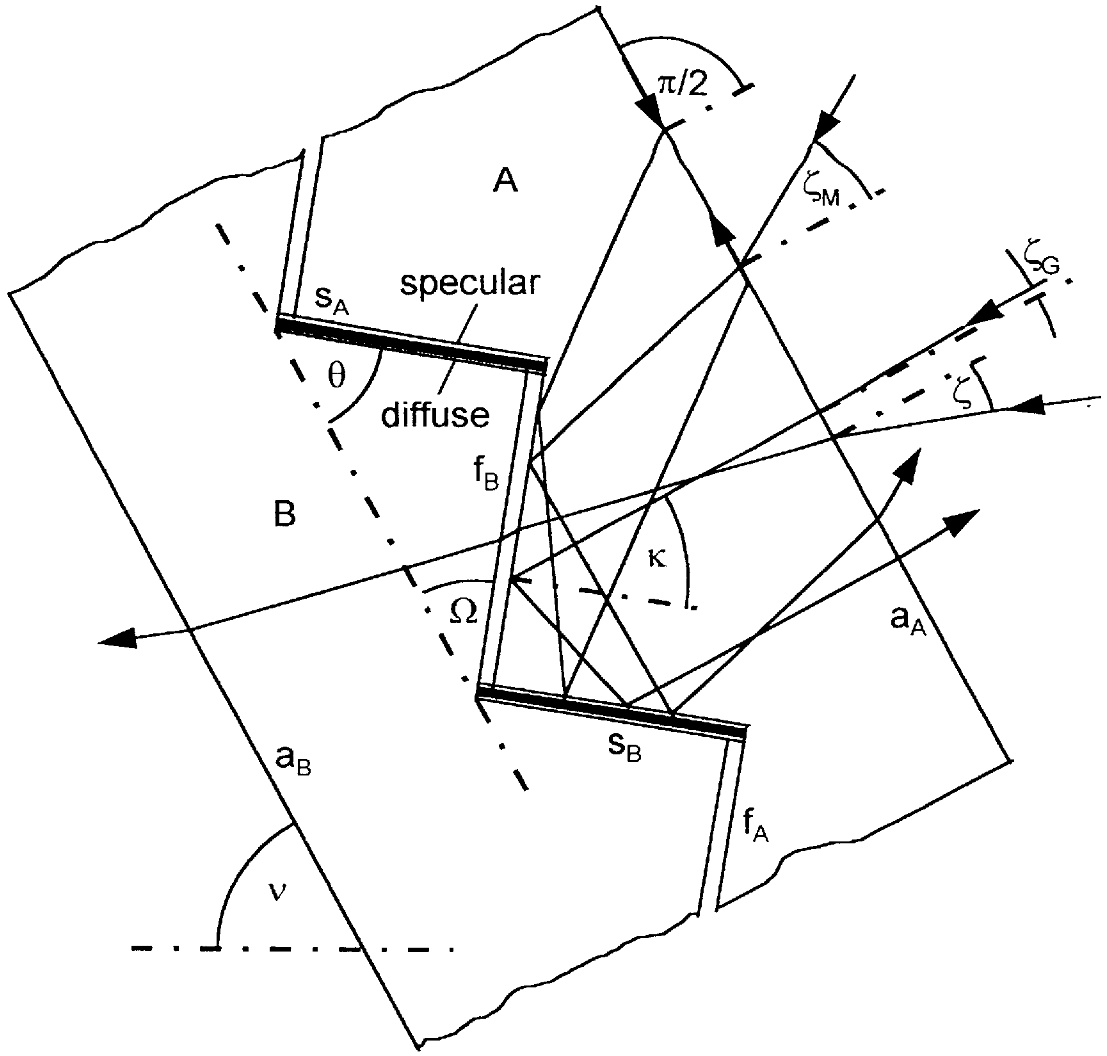
FIG. 12 presents a system of two vertical panes with engaged, horizontal prismatic ribs with specularly reflecting rib faces $s_A$ and diffusely reflecting rib faces $s_B$.

The subject of this patent application is a pane system consisting of two panes with engaged, horizontal prismatic ribs with rectangular cross-section. It is an improvement and a further development of the system consisting of two vertical panes with engaged, horizontal prismatic ribs described in the European patent application 833 01687.6. In order to avoid the major deficiencies of the system described in the European patent application 833 01687.6 the prismatic rib faces $s_A$ of the external prismatic pane are provided with an as perfect as possible specularly reflecting coating and the prismatic rib faces $s_B$ of the internal prismatic pane are provided with an as perfect as possible diffusely reflecting coating (FIG. 12).

Determination of the Parameters of the System

For the general case of a window with arbitrary inclination $\nu$ relative to the horizontal plane and prismatic ribs inclined by an angle $\alpha$ to the horizontal within the window plane a coordinate system P—termed P-system—is defined the $z_P$-axis of which is positioned within the intersecting straight line between the window plane and the cross-sectional plane of the rib and the $x_P$-axis of which has the direction of the window normal. The direction of a ray relative to the P-system shall be defined by the two angles

Figure 13:
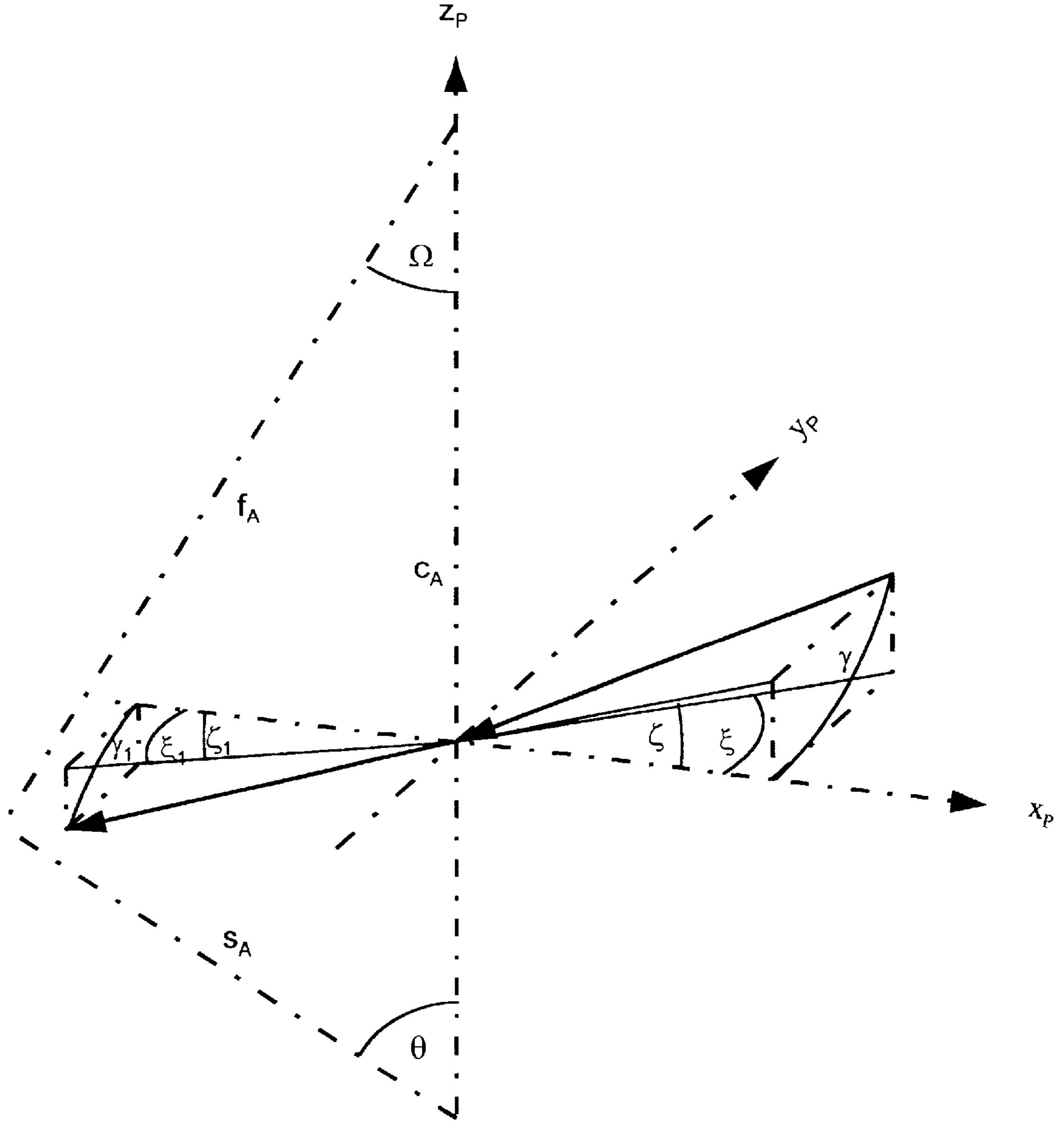
FIG. 13 illustrates the definitions of the incident angle $\gamma$, of the rib length angle $\xi$ and of the rib elevation angle $\zeta$ of a ray and the corresponding angles $\gamma_1$, $\xi_1$ and $\zeta_1$ after refraction and intrusion of the ray into the prismatic rib.

- $\zeta$: angle between the window normal and the ray vector component within the cross-sectional plane of the ribs, called rib elevation angle, and
- $\xi$: angle between the window normal and the ray vector component within the plane which is orthogonal to the cross-sectional plane of the ribs and which contains the window normal, called rib length angle, (FIG. 13).

Along the trace of a ray these angles $\xi$ and $\zeta$ and the incident angle $\gamma$ are denoted by adding the ordinal number of the face contact of the ray—it may be reflection or refraction—as an index.

The inclination angle of the prismatic ribs relative to the horizontal within the window plane is determined by $$\tan\alpha=-\sin\Delta\beta/(\cos\Delta\beta\cdot\cos\nu+\tan\lambda\cdot\sin\nu). \tag{13}$$

Figure 14:
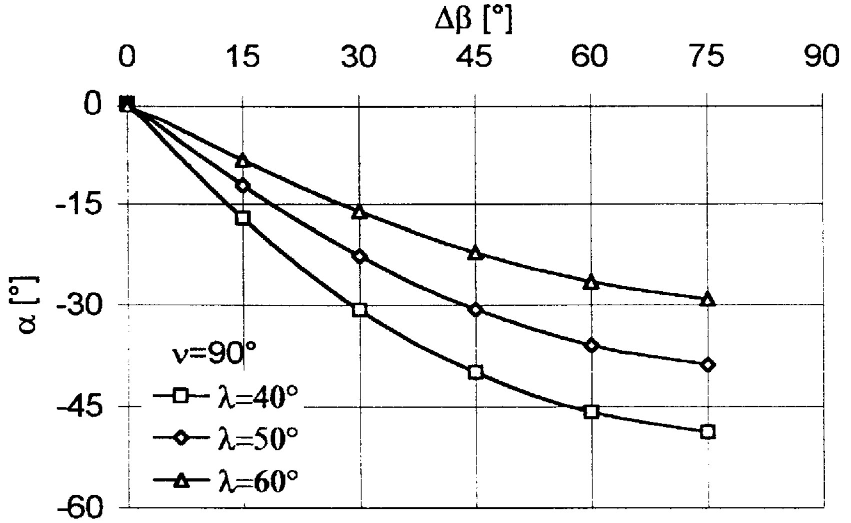
FIG. 14 is a diagram presenting the inclination angle $\alpha$ of the longitudinal axis of the prsmatic ribs relative to the horizontal within the window plane for a window inclination angle $\nu=90°$ and the geographical latitudes $\lambda=40°$, $\lambda=50°$ and $\lambda=60°$ in dependence on window direction angle $\Delta\eta$.
Figure 15:
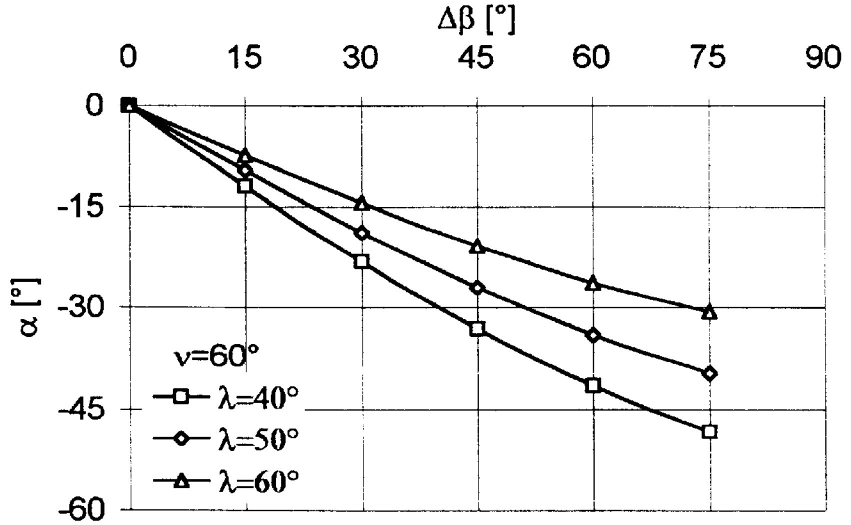
FIG. 15 is a diagram presenting the inclination angle $\alpha$ of the longitudinal axis of the prismatic ribs relative to the horizontal within the window plane for a window inclination angle $\nu=60°$ and the geographical latitudes $\lambda=40°$, $\lambda=50°$ and $\lambda=60°$ in dependence on window direction angle $\Delta\beta$.

As an example $\alpha$ is plotted in FIG. 14 for $\nu=90°$ and in FIG. 15 for $\nu=60°$ each time for the $\lambda$-values 40°, 50° and 60° in dependence on window direction angle $\Delta\beta$.

Corresponding to the definition the solar ray vector has to be orthogonal to the longitudinal axes of the prismatic ribs, if the daytime angle is $\beta=\beta_\nu$. From this condition the general equation for the evaluation of $\beta_\nu$ can be derived:

$$\tan\beta_\nu=[E\cdot(\sin\lambda\cdot\cos\Delta\beta-\cos\lambda\cdot\tan\nu)-\sin\lambda\cdot\tan\Delta\beta]/(1+E\cdot\sin\Delta\beta) \tag{14}$$

with $E=\tan\Delta\beta/(\cos\Delta\beta+\tan\lambda\cdot\tan\nu)$.

The rib elevation angle $\zeta$ relates to the angle $\eta$ by the equation $$\zeta=\eta-\arctan[1/(\tan\nu\cdot\cos\alpha)], \tag{15}$$

i.e. for $\alpha=0°$ holds $\eta=\zeta+\pi/2-\nu$ and for vertical windows ($\nu=90°$) holds $\eta=\zeta$. With this relation $\zeta_S$, $\zeta_0$, $\zeta_G$ and $\zeta_M$ are quite correspondingly defined to $\eta_S$, $\eta_0$, $\eta_G$ and $\eta_M$. The solar ray vector S within the equator plane at the annual time of equinox and within the cross-sectional plane of the ribs at the daytime $t_\nu$, i.e. for the solar declination angle $\delta=0°$ and the daytime angle $\beta_\nu$, is determined in the P-system by $$x_{0\nu}=-C\cdot\sin\nu-\cos\beta_\nu\cdot\cos\lambda\cdot\cos\nu \tag{16a}$$

$$y_{0\nu}=D\cdot\cos\alpha+(C\cdot\cos\nu-\cos\beta_\nu\cdot\cos\lambda\cdot\sin\nu)\cdot\sin\alpha \tag{16b}$$

$$z_{0\nu}=-D\cdot\sin\alpha+(C\cdot\cos\nu-\cos\beta_\nu\cdot\cos\lambda\cdot\sin\nu)\cdot\cos\alpha \tag{16c}$$

with $C=(\cos\beta_\nu\cdot\sin\lambda\cdot\cos\Delta\beta-\sin\beta_\nu\cdot\sin\Delta\beta)$ and $D=(\cos\beta_\nu\cdot\sin\lambda\cdot\sin\Delta\beta+\sin\beta_\nu\cdot\cos\Delta\beta)$ and the rib elevation angle of this solar ray vector is determined by $$\tan\zeta_0=z_{0\nu}/x_{0\nu}. \tag{17}$$

For a required solar blockade period $d_G$ the basic prism angle $\theta$ is determined by $$\theta=\pi/2-\kappa+\arcsin\{1/n\cdot\sin[\delta_0\cdot\cos(2\pi\cdot d_G/d_J)+\zeta_0]\} \quad (18)$$

and, respectively, for a required basic prism angle θ the solar blockade period $d_G$ is determined by $$d_G=d_J/2\pi\cdot\arccos(\{\arcsin[n\cdot\sin(\theta+\kappa-\pi/2)]-\zeta_0\}/\delta_0). \quad (19)$$

Figure 16:
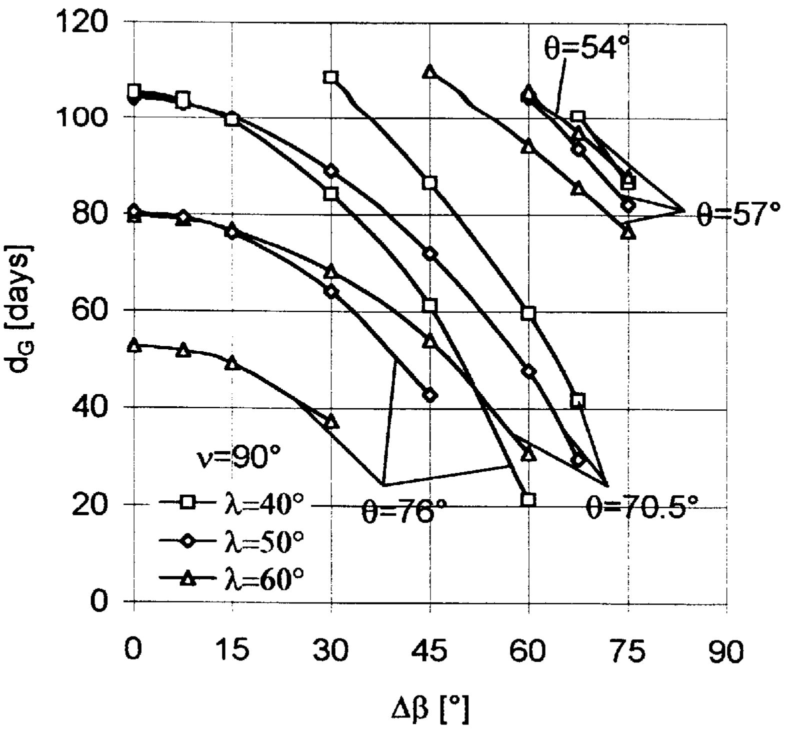
FIG. 16 is a diagram presenting the solar blockade period $d_G$ for the window inclination angle $\nu=90°$, the geographical latitudes $\lambda=40°$, $\lambda=50°$ and $\lambda=60°$ and the basic prism angle $\theta=54°$, $\theta=57°$, $\theta=70.5°$ and $\theta=76°$ in dependence on window direction angle $\Delta\beta$.
Figure 17:
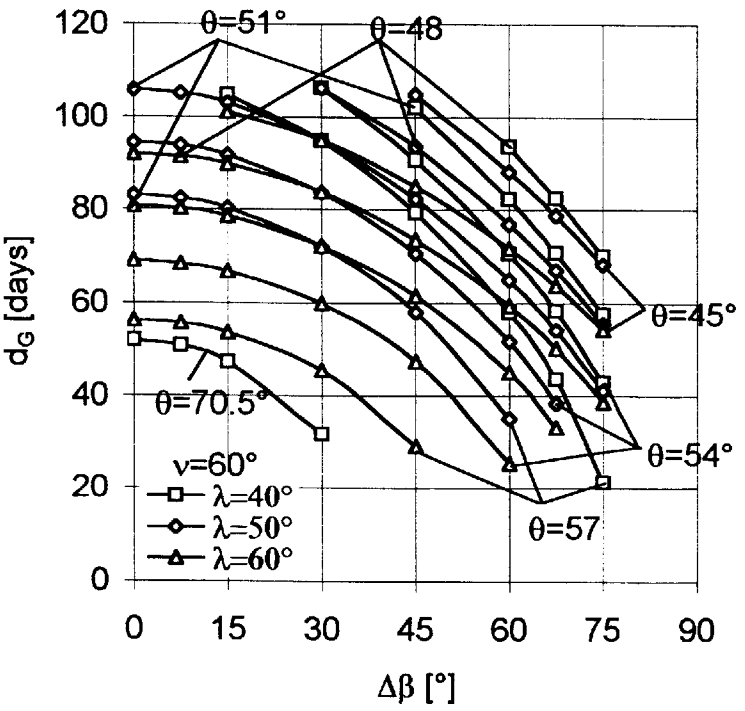
FIG. 17 is a diagram presenting the solar blockade period $d_G$ for the window inclination angle $\nu=60°$, the geographical latitudes $\lambda=40°$, $\lambda=50°$ and $\lambda=60°$ and the basic prism angle $\theta=45°$, $\theta=48°$, $\theta=54°$, $\theta=51°$, $\theta=57°$ and $\theta=70.5°$ in dependence on window direction angle $\Delta\beta$.

As an example the solar blockade period $d_G$ is presented in FIG. 16 for ν=90° and in FIG. 17 for ν=60° each time for the λ-values 40°, 50° and 60° and a selection of θ-values 45°, 48°, 51°, 54°, 57°, 70.5° and 76° in dependence on the window direction angle Δβ. For all calculations the refractive index n of the pane material has been set to 1.5 which corresponds to the refractive index of common window glass and of acrylic glass.

The Clear View Through the System

Rays which do not impinge on the prismatic rib face $s_A$, which penetrate the prismatic rib faces $f_A$ and $f_B$ and which do not impinge on the prismatic rib face $s_B$ penetrate the system without changing the direction. This holds as well for rays directed from the outside to the inside as for rays directed from the inside to the outside. Therefore, in this direction the system is not only penetrable to radiation but provides also a clear view.

Figure 18:
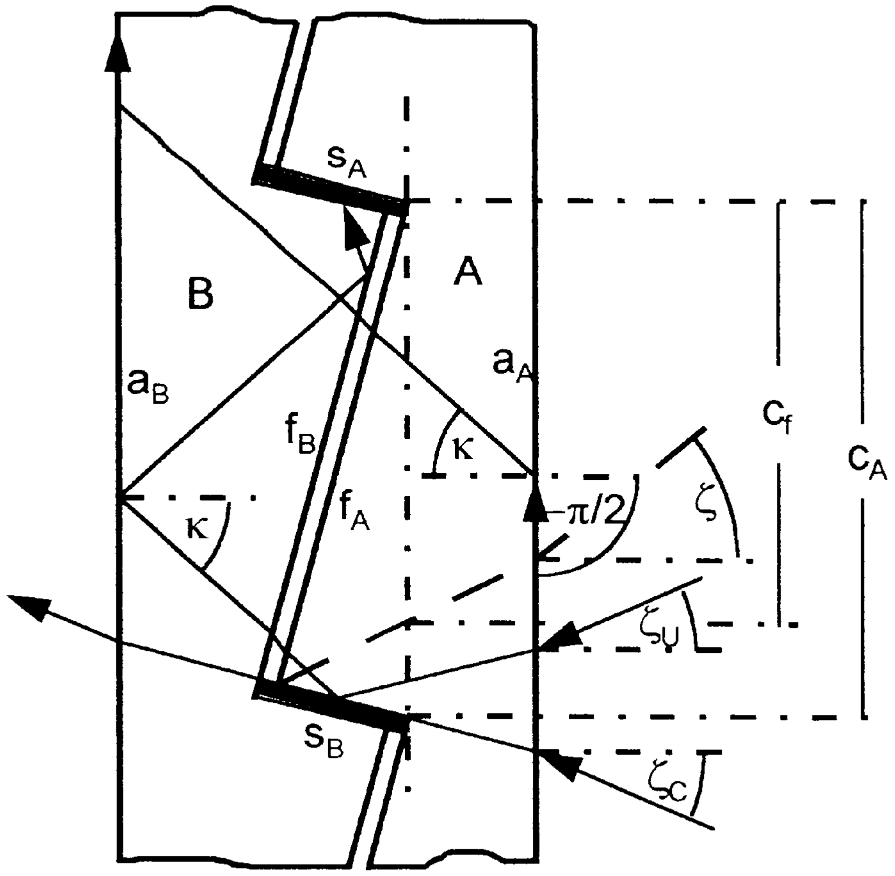
FIG. 18 illustrates the definition of the partial face $c_f$ and the ray direction $\xi,\zeta_U$ and $\xi,\zeta_C$.

$c_f$ is the partial face of a face $c_A$ of a prismatic rib (FIG. 18) which is passed by the fraction of the radiation which, after intruding into the face $a_A$, impinges directly on the rib face $f_A$ and, if $\gamma_2<\kappa$ holds, penetrates the system. This fraction is depending on the actual angle $\zeta_1$ of the incident radiation, is equal to the ratio of both areas $c_f/c_A$ and shall be designated as the view area ratio SV. If the width of the gap between the rib faces $s_A$ and $s_B$ is neglected, the view area ratio can be determined by the aid of the equation $$SV=\sin\theta\cdot\sin(\theta-\zeta_1)/\cos\zeta_1 \quad (20a)$$

for $\zeta_1\geqq\theta-\pi/2$ and $$SV=1+\cos\zeta\cdot\cos(\theta-\zeta_1)/\cos\zeta_1 \quad (20b)$$

for $\zeta_1<\theta-\pi/2$.

Figure 19:
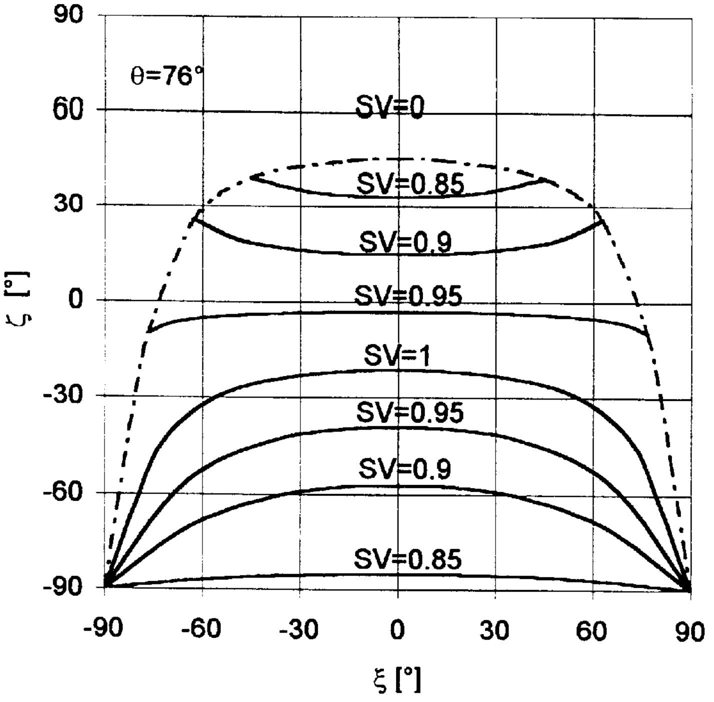
FIG. 19 is a $\xi,\zeta$-diagram of the view area ratio SV for a basic prism angle $\theta=76°$.
Figure 20:
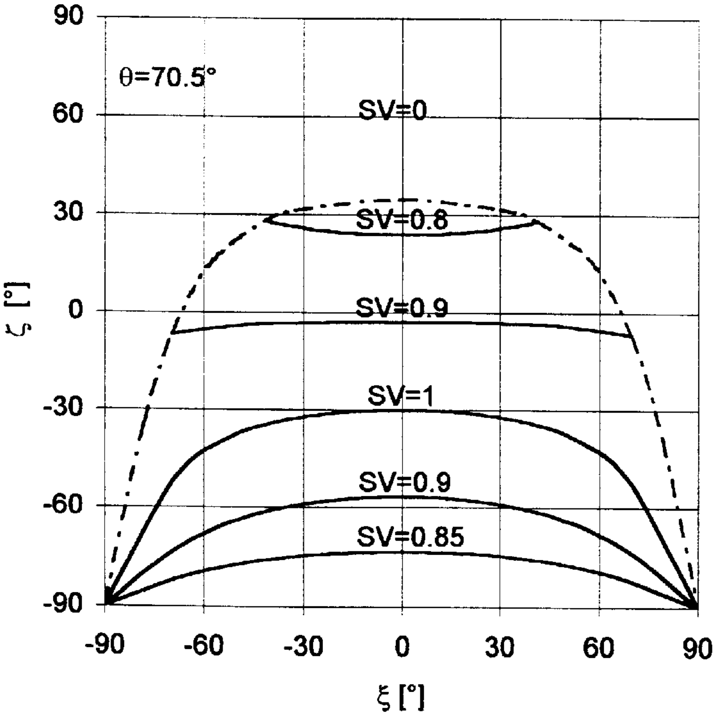
FIG. 20 is a $\xi,\zeta$-diagram of the view area ratio SV for a basic prism angle $\theta=70.5°$.
Figure 21:
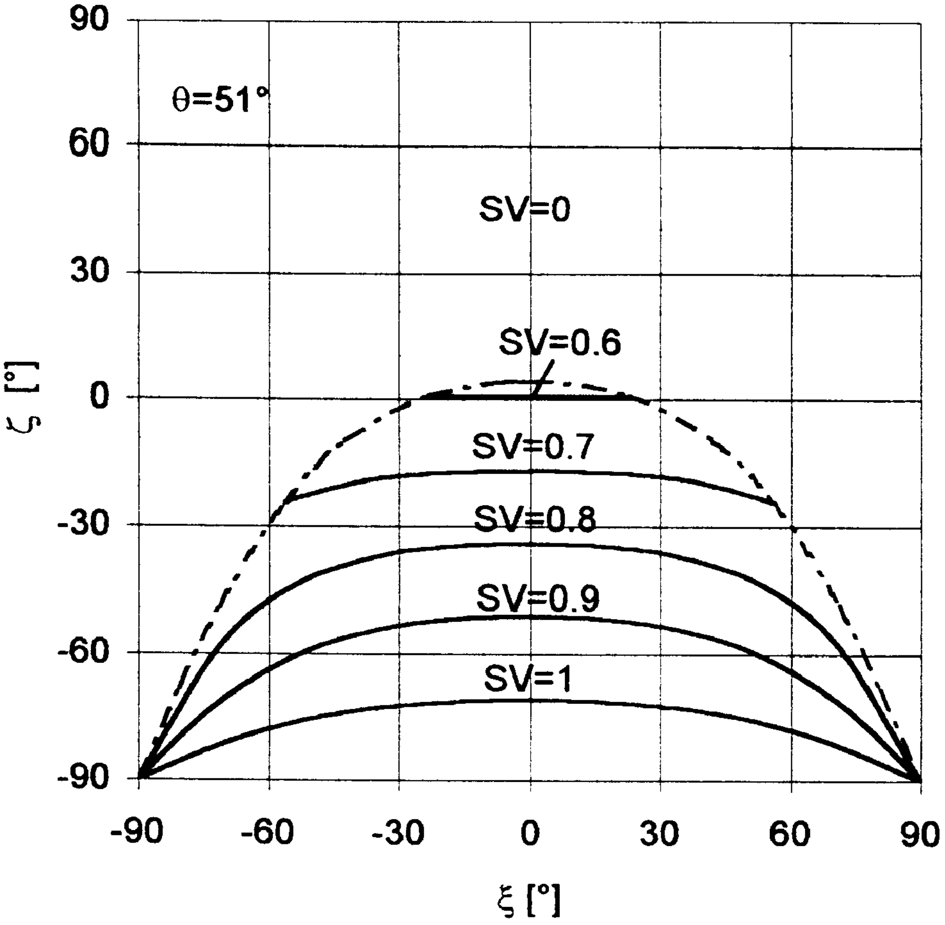
FIG. 21 is a $\xi,\zeta$-diagram of the view area ratio SV for a basic prism angle $\theta=51°$.

The view area ratio SV is plotted in the FIGS. 19, 20 and 21 for the basic prism angles θ=76°, θ=70.5° and θ=51° in a ζξ view-field-diagram. It can be recognized that the view field for θ=76° and θ=70.5° and vertical windows is very little reduced only for the interesting view directions, i.e. for 30°>ζ>−90° and 60°>ξ>−60°. This holds for the system with θ=51°,too, if it is considered that this system is to be applied for roof windows with an inclination angle of e.g. ν=45°. However, a satisfying clear view of the system can be expected only, if the prismatic panes A and B are manufactured with sufficient accuracy and if all the single prismatic faces have smooth and plane surfaces.

Systematic Classification of Ray Traces

In addition to the angles already defined the following shall be defined (FIG. 18):

$\zeta=\zeta_K(\xi)$: the pairs of angles ξ, $\zeta_K$ of the rays which penetrate the prismatic pane A and are just reflected with the incident angle $\gamma_2=\kappa$ at the prismatic rib face $f_A$ fulfil the function $\zeta=\zeta_K(\xi)$. In particular $\zeta_G=\zeta_K(0)$ holds.

$\zeta=\zeta_U(\xi)$: the pairs of angles ξ, $\zeta_U$ of the rays which after being reflected at the specularly reflecting prismatic rib face $s_A$ and after penetrating both of the prismatic rib faces $f_A$ and $f_B$ impinge on the rear face $a_B$ of the prismatic pane B and thereon are just reflected with the critical angle of total reflection κ fulfil the function $\zeta=\zeta_U(\xi)$.

$\zeta=\zeta_C(\xi)$: the pairs of angles $\xi,\zeta_C$ of the rays which penetrate the prismatic pane A parallel to the specularly reflecting prismatic rib face $s_A$ fulfil the function $\zeta=\zeta_C(\xi)$.

Depending on the pair of angles ξ, ζ and the point of impingement of a ray the following ray trace types can be distinguished:

Ray trace 1: The ray with $\zeta<\zeta_K(\xi)$ penetrates $a_A$ and $c_A$, case 1a: intrudes through the partial face $c_f$ into the characteristical prismatic rib, impinges on $f_A$, the rib elevation angle is $$\zeta_2=\zeta_1-\theta+\pi/2, \quad (21)$$

penetrates $f_A$, $f_B$ and $a_B$ and thus penetrates the system, the directions of the intruding ray and of the exiting ray being identical, or, respectively, case 1b: intrudes through the partial face $c$-$c_f$ into the characteristical prismatic rib, is reflected by $s_A$, impinges on $f_A$, the rib elevation angle is $$\zeta_3=-(\zeta_1-\theta+\pi/2), \quad (22)$$

penetrates $f_A$ and $f_B$.

case 1b1, $\zeta_C(\xi)<\zeta<\zeta_K(\xi)$:

case 1b11, $\zeta_U(\xi)<\zeta<\zeta_K(\xi)$ is reflected by $a_B$ and impinges either directly or after one further reflection by $f_B$ or, respectively, after further reflections by $f_B$ and $a_B$ on $s_B$, where a little part of it is absorbed and the major part of it is diffusely reflected—a part of the energy of the ray reflected by $s_B$ penetrates $f_B$, $f_A$ and $a_A$ and thus finally is reflected by the system, whereas a part of the energy of the ray penetrates $a_B$ and thus penetrates the system—or, respectively, case 1b12, $\zeta_C(\xi)<\zeta<\zeta_U(\xi)$: penetrates $a_B$ and thus penetrates the system, the directions of the intruding ray and of the exiting ray being different, or, respectively, case 1b2, $\zeta<\zeta_C(\xi)$: impinges either directly or after one further reflection by $f_B$ or, respectively, after further reflections by $f_B$ and $a_B$ on $S_B$, where a little part of it is absorbed and the major part of it is diffusely reflected—a part of the energy of the ray reflected by $s_B$ penetrates $f_B$, $f_A$ and $a_A$ and thus finally is reflected by the system, whereas a part of the energy of the ray penetrates aB and thus penetrates the system.

Figure 22:
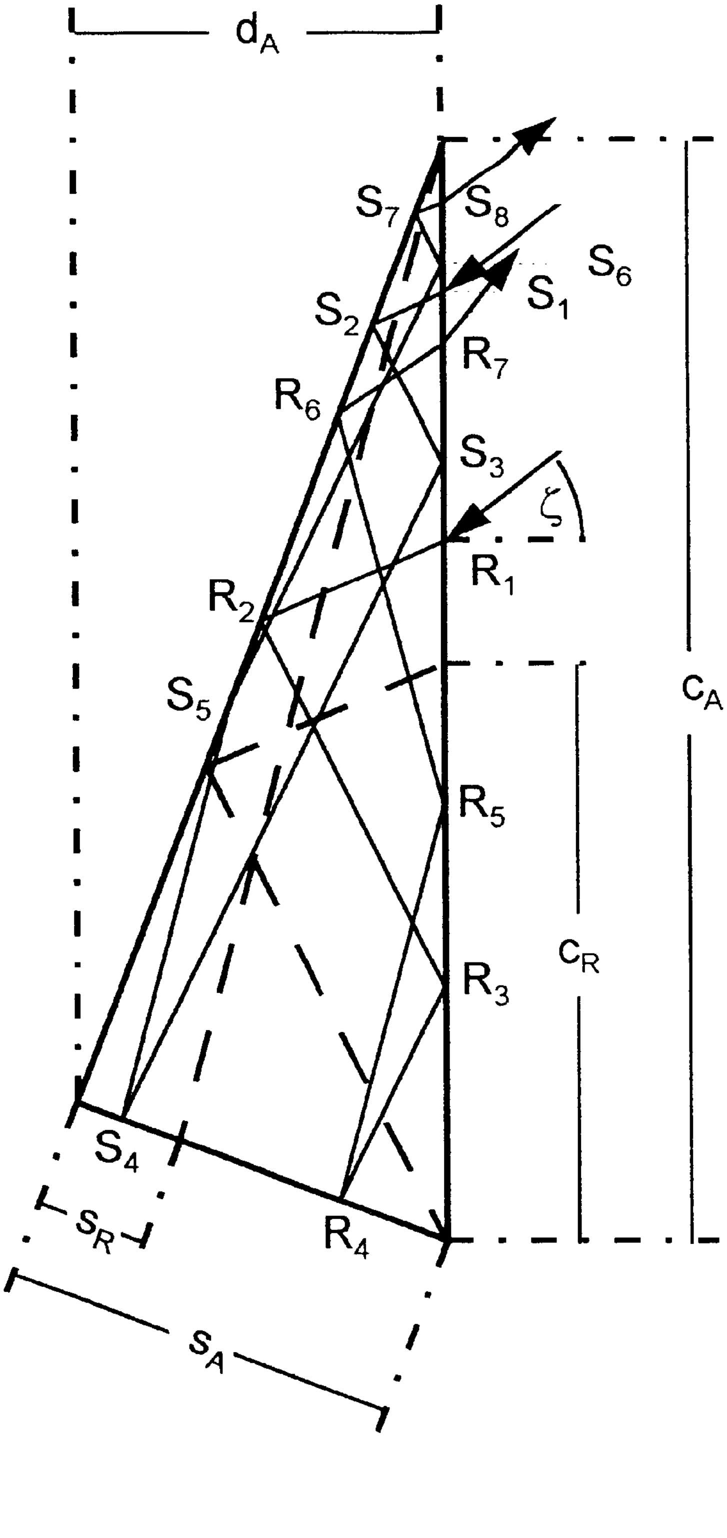
FIG. 22 illustrates different traces—depending on the point of impingement—of two parallel incident rays with 7 and 8 face contacts, respectively.

Ray trace 2: The ray with $\zeta>\zeta_K(\xi)$ penetrates $a_A$ and $c_A$, case 2a: intrudes through the partial face C into the characteristical prismatic rib, is either case 2a1: first by $f_A$ and then by $s_A$ reflected or case 2a2: first by $s_A$ and then by $f_A$ reflected, penetrates $a_A$ in the opposite direction of the direction of the intruding ray and, thus, is rejected by the system or, respectively, case 2b: intrudes through the partial face $c_A$-$C_R$ into the characteristical prismatic rib, is first by $f_A$ and then by $a_A$ reflected, case 2b1: is reflected by the partial face $s_R$ of $s_A$ (ray trace S in FIG. 22)

—the partial face $s_R$ is intersected from the face $s_A$ by the plane which contains the upper edge of the characteristical prismatic rib and is parallel to the ray from the 4. to the 5. face contact, thus $$s_R/s_A=\tan(3\theta-\zeta_1-\pi)\cdot\tan\theta \quad (23)$$

holds— is reflected by $f_A$ and—for an adequate angle θ and after further reflections by $a_A$ and $f_A$—penetrates $a_A$ in the opposite direction of the direction of the intruding ray and, thus, is rejected by the system or, respectively, case 2b2: is reflected at the partial face $s_A$-$s_R$ (ray trace R in FIG. 22), case 2b21: penetrates $a_A$ and, thus, is rejected by the system or, respectively, case 2b22: is reflected by $a_A$ and—for an adequate angle θ and after one further reflection by $a_A$ or, respectively, after further reflections by $a_A$ and $f_A$—penetrates $f_A$ and, thus, penetrates the system or, respectively, penetrates aA and, thus, is rejected by the system, the directions of the intruding ray and of the exiting ray being different.

It can be recognized from eqn. 21 and 22 that in case 1a the absolute value of the rib elevation angle $\zeta_2$ of a ray impinging on the face $f_A$ with the initial direction of incidence ξ, ζ is equal to the absolute value of the rib elevation angle $\zeta_3$ of a ray impinging on the face $f_A$ with the same initial direction of incidence ξ, ζ in case 1b. Appropriate statements hold for the cases 2a1 and 2a2. Therefore, if in these cases a ray penetrates the system or is rejected by the system, depends on the direction of the ray, only, and does not depend on the point of impingement of the ray. This property of the system is caused by the orthogonality of the characteristical cross-section of the rib which, therefore, is kept for all design variations.

In the cases 1b11 and 1b2a fraction of the energy diffusely reflected by the rib face $s_B$ finally penetrates $a_A$ and, thus, is rejected by the system, whereas the remaining fraction finally penetrates $a_B$ and, thus, penetrates the system. In a simplified, sufficiently accurate way the fractions are determined by the roughly calculated radiation exchange factors between the faces $s_B$ and $a_B$ $$F(s_B \rightarrow a_B)=(1+\cos\theta)/2 \quad (24)$$

and, respectively, between the faces $s_B$ and $a_A$ $$F(s_B a_A)=(1-\cos\theta)/2. \quad (25)$$

In case 1b12 the rib elevation angle $\zeta_5$ of the ray impinging on $a_B$ can be determined from the rib elevation angle $\zeta_1$ of the ray refracted at $a_A$ by $$\zeta_5=\pi+\zeta_1-2\theta. \quad (26)$$

As from Fresnel's equations arises, the transition of a ray from one transparent material to an other transparent material with different refractive index is subject to reflection losses. The internal total reflection within a transparent material, however, is practically not subjected to losses that, consequently, a ray on a trace with multiple internal total reflections loses energy by absorption within the material only. Even for multiple internal total reflections the energy of a ray lost by absorption within common window glass or particularly in acrylic glass is very modest—but not negligible—because of the still relatively short travelling distance of the ray within the material.

Derivation of a Criterion for the Choice of the Basic Prism Angle θ

The case 2b2 has to be investigated more thoroughly, because—depending on the pair of angles ξ, ζ of the ray and on the basic prism angle θ—the ray as well can penetrate the system as can be rejected by the system. In order to enable a preliminary choice of the basic prism angle θ which cause the desired reflective properties of the system in the case 2b2, too, in the following—simplifying—ray traces for ξ=0° are investigated.

For $\theta=\Omega=45°$ $c_R/c_A \geqq 1$ holds, i.e. no partial face $c_A$-$c_R$ exists and, therefore, rays with $\zeta>\zeta_K(\xi)$ are rejected by the system after exactly 4 face contacts.

For θ>45° $c_R/c_A<1$ is possible, i.e. a partial face $c_A$-$c_R$ may exist. Rays with $\zeta>\zeta_K(\xi)$ which intrude through the partial face $c_A$-$c_R$ into the characteristical prismatic rib are reflected by $f_A$, $a_A$ and $s_A$, impinge again on $a_A$ and, thus, experience at least 5 face contacts. For the rib elevation angle at the 5. face contact holds $$\zeta_5=3\theta-\zeta_2-\pi/2. \quad (27)$$

In order that all rays with ξ=0° and $\zeta>\zeta_G$ penetrate the rib $a_A$ after 5 face contacts and, thus, are rejected by the system (ray trace 2b21) $\zeta_2 \geqq \kappa$ and $\zeta_5 \leqq \kappa$ is required. Therefore, from eqn. 27 results that the maximum basic prism angle θ which just still enables the reflection of all rays with ξ=0° and $\zeta>\zeta_G$ after 5 face contacts is $$\theta_{5Kmax}=(2\kappa+\pi/2)/3=57.874°. \quad (28)$$

As can be recognized from FIGS. 16 and 17, systems with $\theta<\theta_{5Kmax}$ are suited only for windows which are inclined to the horizontal (ν<90°) and/or have window directions Δβ≠0°, as only in this case desired solar blockade periods in the range of 30 to 120 days may be accomplished. On the basis of these calculations the basic prism angle is chosen in the range $45° \leqq \theta_{5K} \leqq 58°$ for systems which reject radiation with 4 or, respectively, 5 face contacts (termed 5K-systems).

Figure 23:
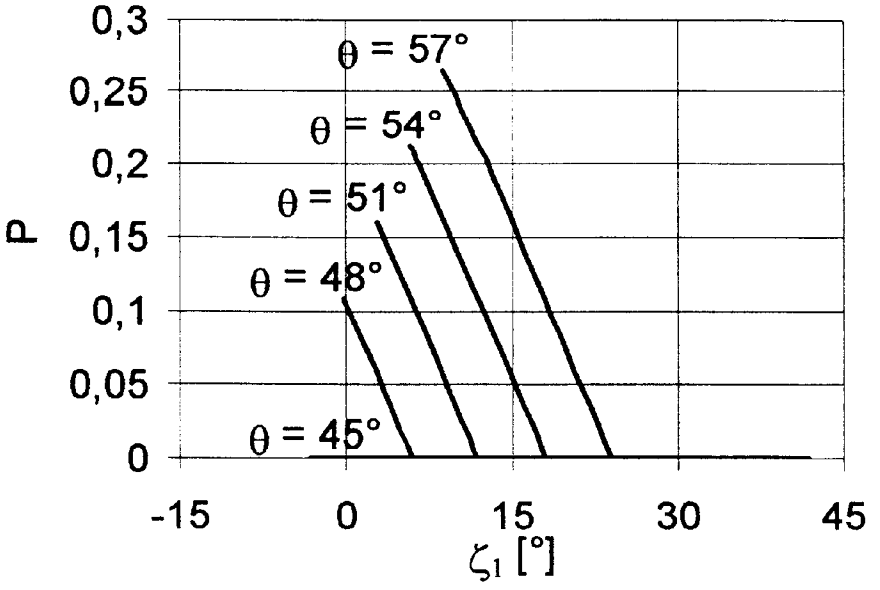
FIG. 23 is a diagram presenting the radiation fraction P with the ray trace type 2b2 of the total radiation intruding with a rib elevation angle $\zeta_1$ at for the basic prism angles $\theta=45°$, $\theta=48°$, $\theta=51°$, $\theta=54°$ and $\theta=57°$ in dependence on the rib elevation angle $\zeta_1$.

The radiation which intrudes through the partial face $c_A$-$c_R$ into the characteristical prismatic rib has the fraction $P=1-c_R/c_A$ of the total radiation intruding with a direction $\zeta_1$. For 5K-systems the fraction P is presented in FIG. 23 for θ=45°, θ=48°, θ=51°, θ=54° and θ=57° in dependence on $\zeta_1$.

Rays with $\zeta>\zeta_K(\xi)$ which intrude through the partial face $c_A$-$c_R$ into the characteristical prismatic rib, are reflected by $f_A$, $a_A$ and the partial face $s_A$-$s_R$, then again are reflected by $a_A$ and $f_A$, impinge again on $a_A$ and, thus, experience at least 7 face contacts. For the rib elevation angle at the 6. and 7. face contact hold $$\zeta_6=5\theta-\zeta_1-3/2\pi \quad (29)$$

and $$\zeta_7=5\theta-\zeta_2-3/2\pi. \quad (30)$$

In order that a ray after 7 face contacts can be rejected by the system, the ray is not to penetrate $f_A$ at the 6. face contact, i.e. $\zeta_6 \geqq \kappa$ has to hold. Therefore, from eqn. 29 results that the minimum basic prism angle θ which just still enables the rejection of all solar rays with $\zeta \leqq \zeta_M$ after 6 face contacts is $$\theta_{7Kmin}=(\kappa+\zeta_{M1}+3/2\pi)/5. \quad (31)$$

For Δβ=0°, ν=90° and λ=60° holds $\zeta_M$=53.45° and $\theta_{7Kmin}$=68.838° and for Δβ=0°, ν=90° and λ=30° holds $\zeta_M$=83.45° and $\theta_{7Kmin}$=70.657°. From eqns. 9, 13 and 15 can be concluded that $\zeta_M(\Delta\beta\neq0°,\nu,\lambda)<\zeta_M(\Delta\beta=0°,\nu\lambda)$ and, therefore, $\theta_{7Kmin}(\Delta\beta\neq0°, \nu,\lambda)<\theta_{7Kmin}(\Delta\beta=0°,\nu,\lambda)$ holds.

From eqn. 30 and corresponding reasons as for 5 face contacts the maximum basic prism angle θ which just still enables the reflection of all rays with ξ=0° and $\zeta>\zeta_G$ after 7 face contacts is $$\theta_{7Kmax}=(2\kappa+3/2\pi)/5=70.724°. \quad (32)$$

On the basis of these calculations the basic prism angle is chosen in the range $68° \leqq \theta_{7K} \leqq 71°$ for systems which reject radiation with 4 or, respectively, 7 face contacts (termed 7K-systems).

The radiation which intrudes through the partial face $c_A$-$c_R$ into the characteristical prismatic rib and is reflected by the partial face has the fraction $P=(1-c_R/c_A)\cdot(1-s_R/s_A)$ of the total radiation intruding with a direction $\zeta_1$. For 7K-systems the fraction P is presented in FIG. 24 for $\theta=70.5°$ in dependence on $\zeta_1$.

For 9 face contacts quite correspondingly holds $$\zeta_8=7\theta-\zeta_1-5/2\pi, \quad (33)$$

$$\zeta_9=7\theta-\zeta_2-5/2\pi, \quad (34)$$

$$\theta_{9Kmin}=(\kappa+\zeta_{M1}+5/2\pi)/7, \quad (35)$$

$$\theta_{9Kmax}=(2\kappa+5/2\pi)/7=76.232°. \quad (36)$$

For $\Delta\beta=0°$, $\nu=90°$ and $\lambda=60°$ holds $\zeta_M=53.45°$ and $\theta_{9Kmin}=74.885°$ and for $\Delta\beta=0°$, $\nu=90°$ and $\lambda=30°$ holds $\zeta_M=83.45°$ and $\theta_{9Kmin}=76.184°$ and correspondingly holds $\theta_{9Kmin}(\Delta\beta\neq 0°,\nu\lambda)<\theta_{9Kmin}(\Delta\beta=0°,\ \nu,\lambda)$.

On the basis of these calculations the basic prism angle is chosen in the range $74° \leqq \theta_{9K} \leqq 77°$ for systems which reject radiation with 4 or, respectively, 9 face contacts (termed 9K-systems).

The radiation which intrudes through the partial face $c_A$-$c_R$ into the characteristical prismatic rib and is reflected by the partial face has the fraction $P=(1-c_R/c_A)\cdot(1-s_R/s_A)$ of the total radiation intruding with a direction $\zeta_1$. For 9K-systems the fraction P is presented in FIG. 25 for $\theta=76°$ in dependence on $\zeta_1$.

Prismatic ribs which are based on 11 or more face contacts need not to be investigated, as the resulting solar blockade periods are too short for an application in a system protecting from solar radiation.

A detailed assessment about the effect protecting from solar radiation of these chosen systems for rays with $\xi\neq 0°$ with the aid of $\xi,\zeta$-diagrams leads to following result:

5K-systems with $45° \leqq \theta \leqq 58°$: The radiation which intrudes through $c_A$-$c_R$ into the characteristical prismatic rib and is reflected at the 4. face contact by $s_A$-$s_R$ is only a little fraction P of the total incident radiation and can be possible in a narrow $\zeta_1$-range (FIG. 23) only. The energy of the solar radiation with $|\xi|>60°$ from the narrow $\zeta_1$-range which can impinge on the rib face $S_B$ and partly penetrate the system in an undesired way is insignificant.

Figure 24:
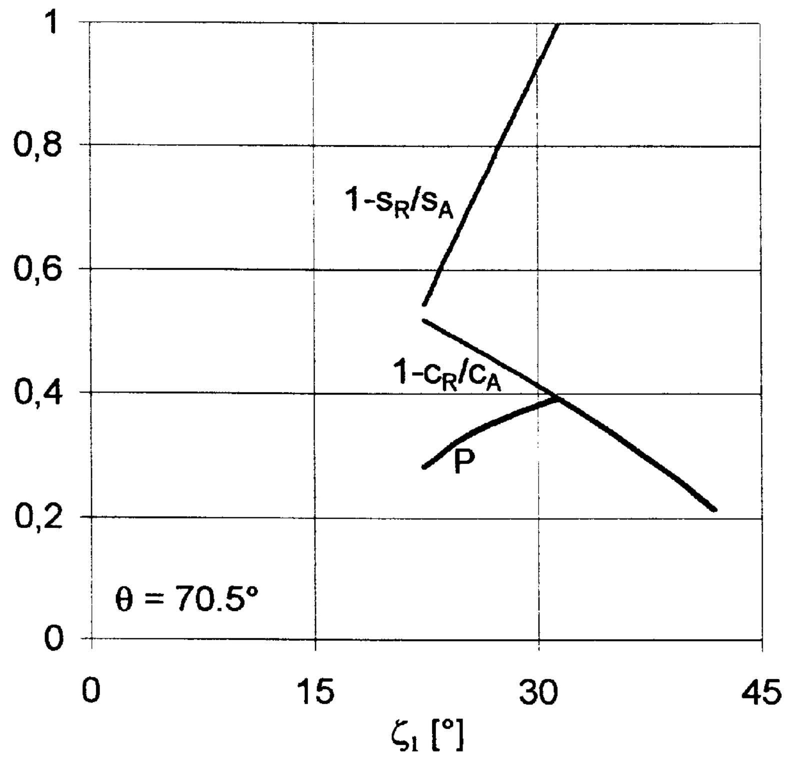
FIG. 24 is a diagram presenting the radiation fraction P with the ray trace type 2b22 the total radiation intruding with a rib elevation angle $\zeta_1$ for the basic prism angle $\theta=70.5°$ in dependence on the rib elevation angle $\zeta_1$.

7K-systems with $68° \leqq \theta \leqq 71°$: The radiation which intrudes through $c_A$-$c_R$ into the characteristical prismatic rib and is reflected at the 4 face contact by $s_A$-$s_R$ is a fraction P in the range $0.2 \leqq P \leqq 0.4$ of the total incident radiation and is possible from a range $\zeta_1 \geqq 22°$ (FIG. 24). The energy of the solar radiation with $|\xi|>60°$ at the annual time of summer solstice or, respectively, of the solar radiation with $|\xi|>30°$ at the annual time of $d_J/6$ before or after the summer solstice from the aforementioned $\zeta_1$-range which can impinge on the rib face $S_B$ and partly penetrate the system in an undesired way is still to be looked upon as inferior in comparison to the reflected solar radiation energy.

Figure 25:
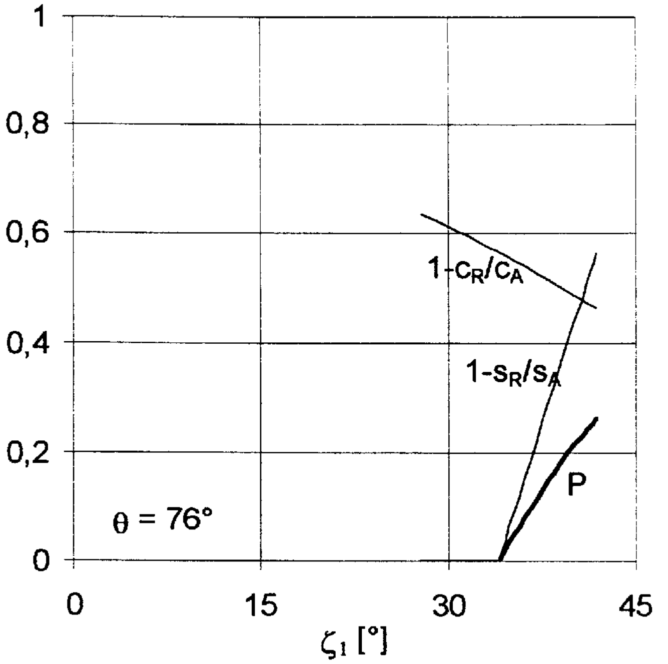
FIG. 25 is a diagram presenting the radiation fraction P with the ray trace type 2b22 of the total radiation intruding with a rib elevation angle $\zeta_1$ for the basic prism angle $\theta=76°$ in dependence on the rib elevation angle $\zeta_1$.

9K-systems with $74° \leqq \theta \leqq 77°$: The radiation which intrudes through $c_A$-$c_R$ into the characteristical prismatic rib and is reflected at the 4. face contact by $s_A$-$s_R$ is a fraction P in the range $0 \leqq P \leqq 0.26$ of the total incident radiation and is possible from a range $\zeta_1 \leqq 34°$ (FIG. 25). For this system, however, there are no rays with the trace 2b22 which are reflected by $a_A$ at the 9. face contact, penetrate $f_A$ and $f_B$, are diffusely reflected by $s_B$ and finally partially penetrate $a_B$. This system, therefore, has quite perfect properties as a system protecting from solar radiation.

Figure 26:
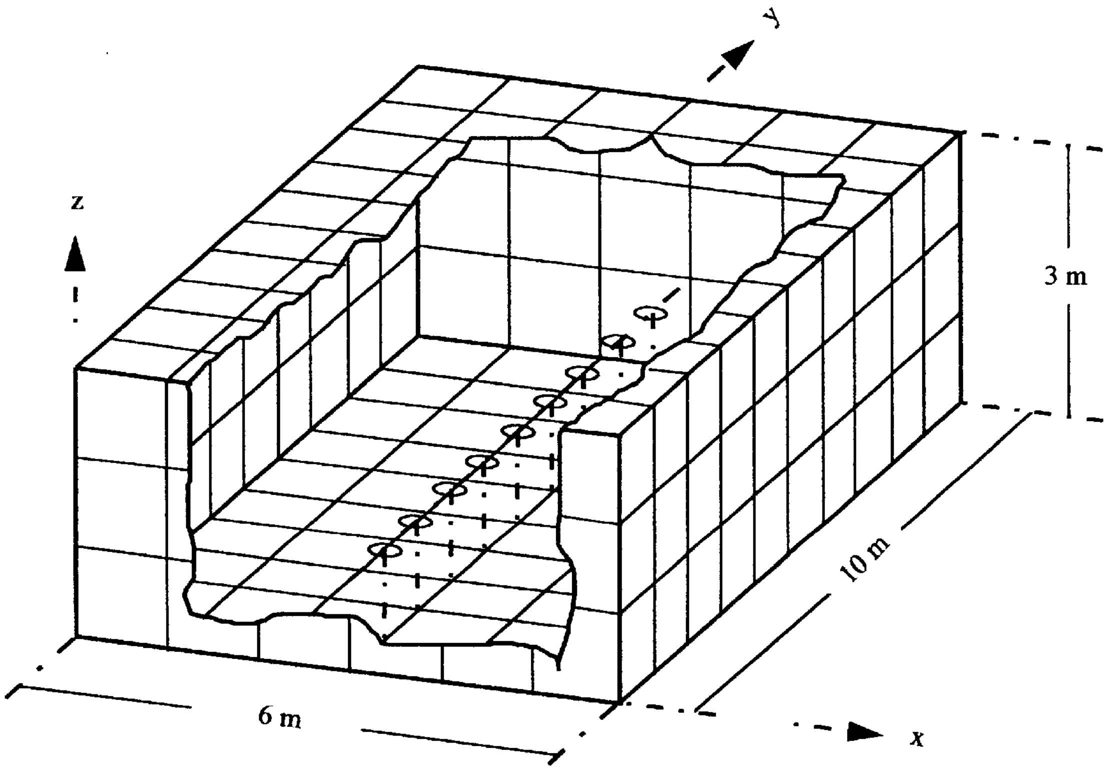
FIG. 26 depicts a testroom for the computation of the distribution of illumination and the quantities of heat irradiated into and lost by the windows.

The solar rays reflected by the mirror faces $s_A$ of these systems do not cause glare effects. However, a glare effect from solar rays reflected by the rib faces $s_B$ of the inner prismatic pane B would occur, if the rib faces $S_B$ would be provided with a specularly reflecting coating. For this reason the rib faces $S_B$ are provided with a diffusely reflecting coating Performance of the New Pane in Comparison to Other Panes The Test Room For a test room, as depicted in FIG. 26, the illumination of all partial areas and element areas as well as the heat radiation intruding into the window areas and the heat transfer at the window areas caused by the temperature difference between inside and outside have been calculated employing the computer program BELEUSYS. The test room has the shape of a squared body with a width of 6 m, a length of 10 m and a height of 3 m. A rectangular x,y,z coordinate system is defined for the room. The width of the room extends from the yz-plane in the direction of the x-axis, the length of the room from the zx-plane in the direction of the y-axis and the height of the room from the xy-plane in the direction of the z-axis. The areas of the room are divided 6 times along the width, 10 times along the length and 3 times along the height such that there are in total 216 partial areas of a size of 1 m×1 m which enclose the room. The entire wall area of the room in +y-direction is a transparent window area, whereas the remaining wall areas, the floor area and the ceiling area are non-transparent areas. The floor area has a diffuse reflectance of 0.2 (corresponding to dark carpet), the wall areas with the exception of the window areas have up to a height of 1 m a diffuse reflectance of 0.5, whereas these wall areas above the height of 1 m and the ceiling area have a diffuse reflectance of 0.8 (corresponding to a white paint coating). In the symmetry plane of the room 1 m above the common corner points of each 4 adjacent partial areas there are 9 element areas with the normals pointing to the +z-direction. Lamps are not existing in this computer model. Furthermore, buildings and trees outside of the test room which could shadow out the radiation which is incident from the sun, the sky and/or the earth through the window area into the test room are not existing.

In order to clearly point out the influence of the glazing of the window area on the magnitude and the distribution of the illumination in the room and, respectively, on the irradiated and lost quantities of heat, each calculation is performed for three different panes of the window area with the other parameters and conditions remaining identical:

Isolating pane: 2 panes of common glass of a thickness of 4 mm each and an intermediate space of 12 mm, refractive index: 1.50, light transmittance for vertically incident light: 0.790, degree of diffusion: 0, light reflectance for vertically incident light: 0.150, total energy transmittance: 0.770, reduction of transparent area: 0.90, reduction of light transmission: 0.90, heat transfer coefficient [W/Km$^2$]: 3.000.

Solar protective pane: 2 panes of common glass of a thickness of 6 mm each and an intermediate space of 12 mm, reflective layer for infrared radiation and Argon filling, refractive index: 1.50, light transmittance for vertically incident light: 0.660, degree of diffusion: 0, light reflectance for vertically incident light: 0.150, total energy transmittance: 0.470, reduction of transparent area: 0.90, reduction of light transmission: 0.90, heat transfer coefficient [W/Km$^2$]: 1.700.

Prismatic pane: 2 panes of prismatic glass with $d_A$=5 mm and a total thickness of 14.5 mm and one pane of common glass of a thickness of 6 mm with an intermediate space of 12 mm, refractive index: 1.50, light transmittance for vertically incident light: 0.743, degree of diffusion: 0, reduction of transparent area: 0.90, reduction of light transmission: 0.90, heat transfer coefficient [W/Km$^2$]: 1.900, geographical latitude (design): 50° north, eastern deviation of the window normal from the south (design window direction): 45°, solar blockade period (design): 71.925 days, window inclination relative to the horizontal plane (design): 90°, basic prism angle: 70.5°, inclination angle of the longitudinal axes of the prismatic ribs relative to the horizontal within the window plane: –30.682°, specular reflectance of the rib face $s_A$: 0.90, diffuse reflectance of the rib face $s_B$: 0.86.

Computational Results

All the computations are performed for a northern geographical latitude of 50°. The reflectance of the surface of the earth is always set to 0.2 (diffuse). The internal temperature of the test room is assumed not to depend on the daytime and on the annual time and is set to 20° C.

Figure 27:
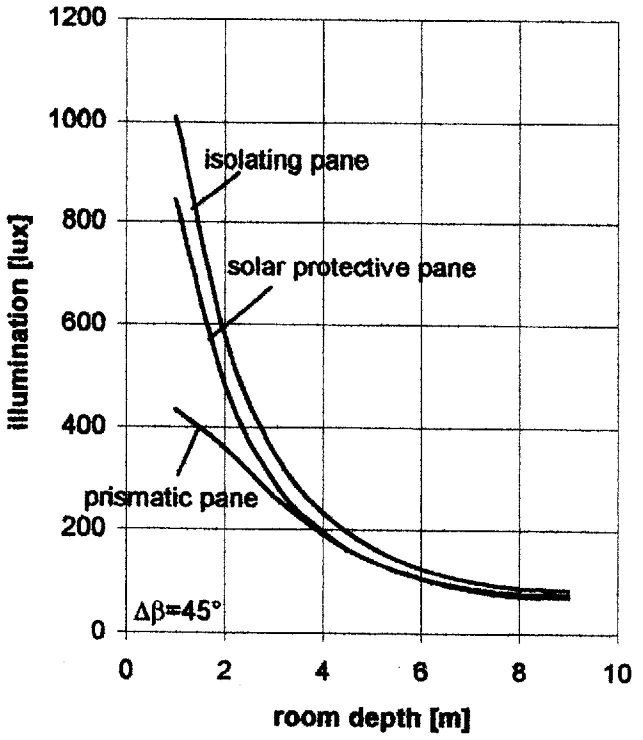
FIG. 27 is a diagram presenting the illumination within the symmetry plane of the testroom in a height of 1 m for an overcast sky on December, 20, at 12 o'clock, for three different panes and for the window direction angle $\Delta\beta=45°$ in dependence on the depth of the room.
Figure 28:
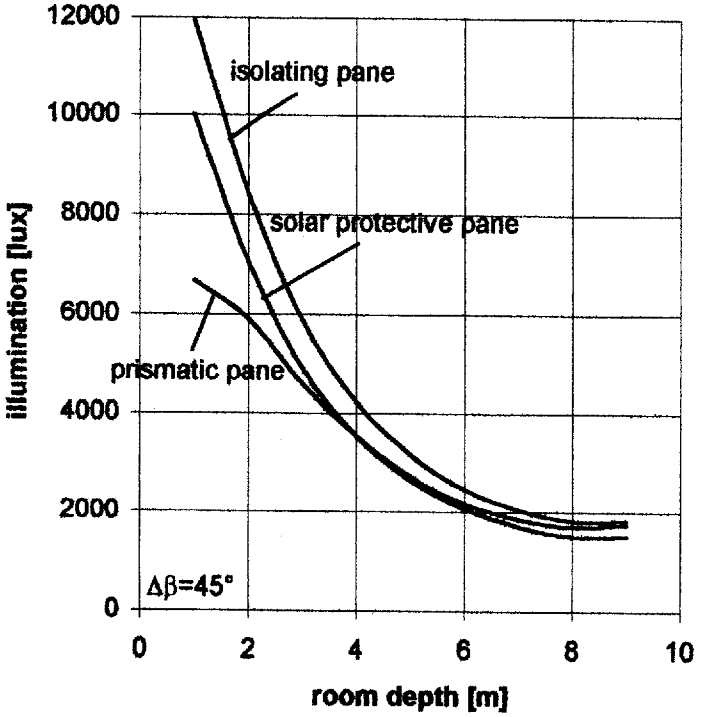
FIG. 28 is a diagram presenting the illumination within the symmetry plane of the testroom in a height of 1 m for a clear sky on June, 20, at 12 o'clock, for three different panes and for the window direction angle $\Delta\beta=45°$ in dependence on the depth of the room.
Figure 29:
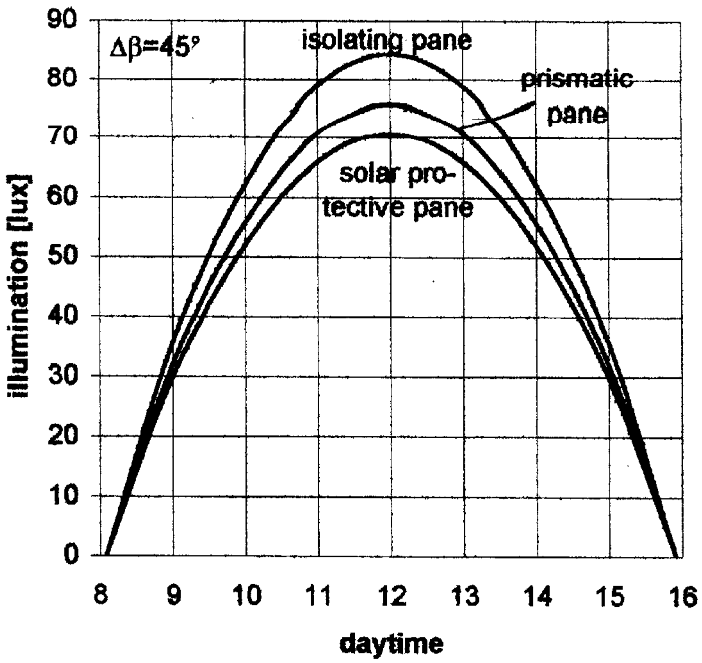
FIG. 29 is a diagram presenting the illumination of an element area within the symmetry plane of the testroom in a height of 1 m which is positioned next to the rear wall of the testroom for an overcast sky on December, 20, at 12 o'clock, for three different panes and for the window direction angle $\Delta\beta=45°$ in dependence on the daytime.
Figure 30:
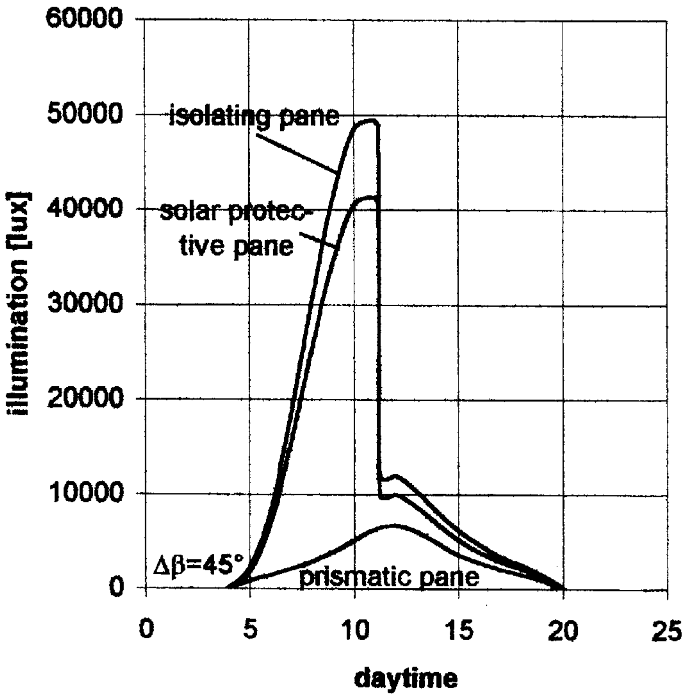
FIG. 30 is a diagram presenting the illumination of an element area within the symmetry plane of the testroom in a height of 1 m which is positioned next to the window of the testroom for a clear sky on June, 20, at 12 o'clock, for three different panes and for the window direction angle $\Delta\beta=45°$ in dependence on the daytime.

Comparison of the illumination within the room for different window glazing: In order to be able to assess the illumination of the test room for a dark day, precisely the 20. Of December with an overcast sky and a mean external temperature of –0.7° C., and a luminous day, precisely the 20. of June with a clear sky, an atmospheric turbidity of 4.39 and a mean external temperature of 18.0° C. is calculated. In FIG. 27 the illumination of the element areas for the vertical window directed to the southeast and equipped either with the isolating pane, the solar protective pane or the prismatic pane at the 20. of December, 12 o'clock, and for an overcast sky are plotted in dependence on the room depth. For the isolating pane and the solar protective pane the illumination strongly decreases with increasing room depth in a typical way. For the prismatic pane the illumination in the vicinity of the window is distinctly less than for the isolating pane and for the solar protective pane, but exceeds the illumination for the solar protective pane a little for a room depth of 3 m and above. For the prismatic pane the tendency to provide a more equalized room illumination can be recognized, although the illumination for all the three panes do not differ significantly in great room depths and are too low for common requirements. In FIG. 28 the illumination of the element areas for the vertical window directed to the southeast and equipped either with the isolating pane, the solar protective pane or the prismatic pane at the 20. of June, 12 o'clock, and for a clear sky are plotted in dependence on the room depth. For the isolating pane and the solar protective pane the illumination strongly decreases with increasing room depth in the typical way, too, but on a very high level. For the prismatic pane the illumination in the vicinity of the window is distinctly less than the very high illumination for the isolating pane and for the solar protective pane, although the element area which is located next to the window area as well as the other element areas is not directly irradiated by the steeply incident solar radiation. In this case the prismatic pane cares for a distinctly improved thermal comfort in the vicinity of the window. For the prismatic pane the tendency to provide a more equalized room illumination can be recognized, too. For the prismatic pane the luminance in the vicinity of the rear wall of the test room is higher than for the solar protective pane and approaches to the illumination for the isolating pane. However, in this case all three panes achieve a illumination in great room depth which satisfies all requirements. In FIG. 29 the illumination of the element area which is next to the rear wall of the test room for the vertical window directed to the southeast and equipped either with the isolating pane, the solar protective pane or the prismatic pane at the 20. of December and for an overcast sky is plotted in dependence on the daytime. It can be recognized that the illumination in the vicinity of the rear wall of the test room calculated for the prismatic pane during the whole day is about in the middle between the illumination data calculated for the isolating pane and the solar protective pane. In FIG. 30 the illumination of the element area which is next to the window area for the vertical window directed to the southeast and equipped either with the isolating pane, the solar protective pane or the prismatic pane at the 20. of June and for a clear sky are plotted in dependence on the daytime. It can be recognized that for the isolating pane and the solar protective pane the element area receives direct solar irradiation until about 11 o'clock and, therefore, exhibits an extremely high illumination. Even if an air conditioning system provides a comfortable mean temperature for the room, the stay in the vicinity of windows with isolating panes or solar protective panes and without additional protection from direct solar irradiation, as e.g. Venetian blinds, turns out to be practically impossible. In comparison to this situation the superior protection from solar radiation of the prismatic pane is particularly impressive. Furthermore, the illumination of the element area in the vicinity of the window during the remaining day after 11 o'clock is for the prismatic pane distinctly below the corresponding ilumination for the isolating pane and for the solar protective pane.

Figure 31:
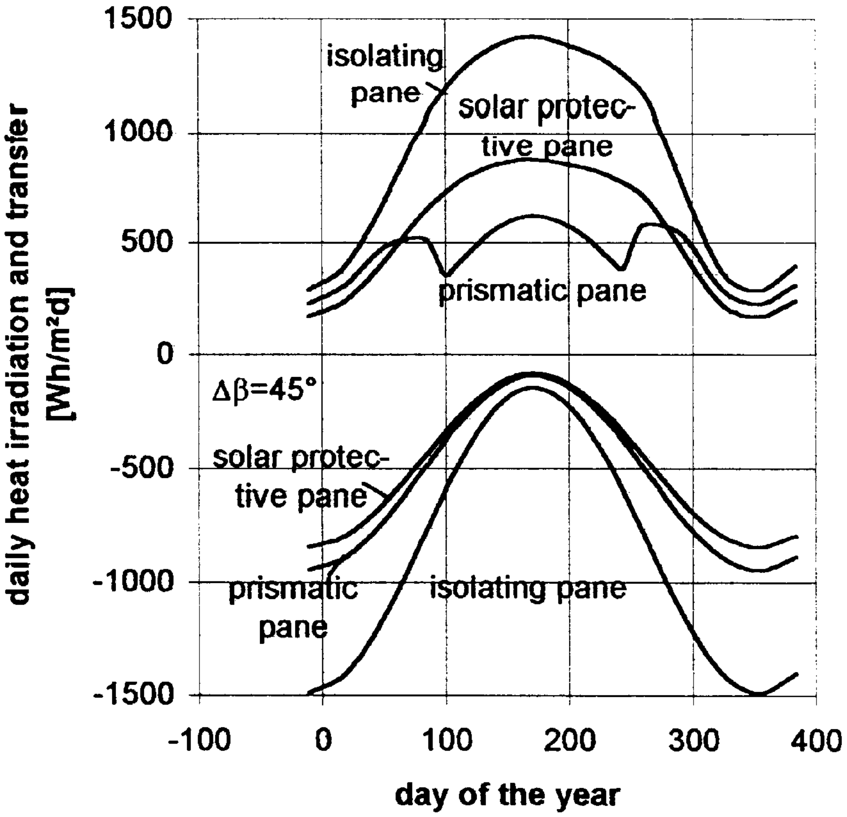
FIG. 31 is a diagram presenting the mean heat quantities per day irradiated into the window area and, respectively, lost by the window area for three different panes and for the window direction angle $\Delta\beta=45°$ in dependence on the annual time.

Comparison of heat quantities irradiated into and transferred by the window with different panes: The heat quantities irradiated into and transferred by the window in dependence on the annual time are determined. The calculations are performed for a "mean" sky in correspondence to DIN 5034, part 2. The calculations are based on the mean external temperature, the mean atmospheric turbidity and the probability of direct solar radiation depending on the annual time as it holds for Frankfurt am Main. In FIG. 31 the heat quantities daily irradiated into the window area and transferred by the window area for the vertical window directed to the southeast and equipped either with the isolating pane, the solar protective pane or the prismatic pane are plotted in dependence of the day of the year. It can be recognized that in winter there is nearly as much heat irradiated into the prismatic pane as into the isolating pane and that there is distinctly more heat irradiated into the prismatic pane than into the solar protective pane, whereas in summer there is much less heat irradiated into the prismatic pane than into the isolating pane and still distinctly less heat irradiated into the prismatic pane than into the solar protective pane. The heat transferred by the prismatic pane is all over the year slightly higher than the heat transferred by the solar protective pane. By similar means as applied for the solar protective pane, however, the heat transfer coefficient of the prismatic pane can be further reduced. In comparison to the isolating pane and to the solar protective pane the energetic advantages of the prismatic pane are significant. If no air conditioning system is applied, the prismatic pane in comparison to the common isolating pane and to the solar protective pane provides a considerable improvement of the thermal comfort during the summer and during the transition periods. For some buildings the application of the prismatic pane will enable the renunciation of an air conditioning system or, respectively, the substitution of an air conditioning system by an air ventilation system. As example calculations for the simultaneous application of prismatic panes and of an air conditioning system for a building—in particular for buildings with large window areas—demonstrate, the additional expenses for the equipment of a building with prismatic panes in comparison to the expenses for the equipment of a building inth common isolating panes or solar protective panes are rapidly compensated by the lower costs of the smaller air conditioning system and by the reduced energy expenses.

Performance of the Prismatic Pane System for Actual Parameters Which Deviate From the Design Parameters An analytical investigation of the prismatic pane system demonstrates that little deviations of the actual geographic latitude λ, the actual window inclination ν and/or the actual window direction Δβ from the parameters which the pane system was designed for and the inclination angle α of the longitudinal axes of the ribs relative to the horizontal within the window plane, the basic prism angle θ and the solar blockade period $d_G$ were determined for are possible without essentially affecting the performance of the system. For instance, the solar protective performance and the energetic effect of the pane system is completely available, if the actual window direction angle Δβ deviates from the design value of this angle by up to ±7,5°. This insensitivity of the pane system to little deviations from the design parameters can be utilized to limit the production of the pane system to a certain number of types which are able to cover the whole bandwidth of the pane system applications. It has to be taken into account, however, that a deviation from the design parameters generally leads to a deviation of the actual solar blockade period $d_G$ from the design value of this parameter For three pane systems the glass materials of which have the refractive index of n=1.5 the partial derivations of the solar blockade period $d_G$ from the geographical latitude λ, the window inclination angle ν and the window direction angle Δβ are presented in the following table.

| | | | |
|---|---|---|---|
| λ [°] | 50 | 50 | 50 |
| ν [°] | 45 | 90 | 90 |
| Δβ [°] | 45 | 45 | 0 |
| α [°] | −27.773 | −30.682 | 0 |
| θ [°] | 48 | 70.5 | 76 |
| $d_G$ [days] | 58.804 | 71.925 | 80.309 |
| $\partial d_G/\partial\lambda$ [days/°] | −5.5 | −1.6 | 0 |
| $\partial d_G/\partial\nu$ [days/°] | 2.0 | −0.1 | 2.5 |
| $\partial d_G/\partial\Delta\beta$ [days/°] | 1.9 | −1.3 | 2.5 |

Constructional Design and Embodiments of the New Glazing

The cross-sections of the characteristical prismatic ribs of both prismatic panes A and B presented in FIG. 12 have identical dimensions. The geometry of the prismatic pane B arise from the geometry of the prismatic pane A by rotating with the angle π around the longitudinal axis of the prismatic rib ($y_p$-axis). Therefore, the glass bodies of both prismatic panes are identical and can be manufactured with the same tools.

Requirements to be Fulfilled by the Constructional Design

The operation of the system requires that both rib faces $f_A$ and $f_B$ are separated by a narrow gap Z, that the rib face $s_A$ is provided with an as perfect as possible specularly reflecting coating and that the rib face $s_B$ is provided with an as perfect as possible diffusely reflecting coating. There must be no gap between the reflecting coating and the glass material of each of the rib faces in order to avoid additional reflection losses of the rays by exiting from the glass body and reentering into the glass body at these faces. The reflection properties of the reflecting coatings shall be altered as little as possible by environmental influences, in particular by solar radiation.

The gap Z has to be as narrow as possible from manufacturing points of view in relation to the prismatic faces $s_A$ or, respectively, $s_B$, but has to reliably exist for all environmental conditions (external temperature, internal temperature, air pressure, wind loads, inherent weight for inclined windows), i.e. even a temporary contact between the rib faces $f_A$ and $f_B$ is not to occur. From operational reasons there is no gap necessary between $s_A$ and $s_B$, but, if it exists, it shall be as narrow as possible from manufacturing points of view, too, that the non-transparent fraction of the rib face $f_A$ or $f_B$, respectively, remains as low as possible. Therefore, on one hand the prismatic faces $s_A$ and $s_B$ have to be sufficiently large that the relative gap width of Z is approximately negligible small and the operation of the system is not affected. On the other hand the height of the prismatic ribs and, thus, all the dimensions of the prismatic ribs are chosen as small as possible, in order to keep the thickness and, subsequently, the weight and the costs of the system as low as possible. A thickness of the characteristical prismatic rib $d_A$ of about 4 mm to 8 mm (FIG. 22) can fulfil the contradictory requirements with a good compromise.

Finally the system has to fulfil the requirements which hold for common glazing. The system has to have a sufficient mechanical stability, i.e. it has to be sufficiently stable referring to shocks, wind loads and tensile stresses induced by temperature differences or by variations of atmospheric pressure. Both prismatic panes A and B have to be firmly and durably connected to each other. A rounded transition of the concave, rectangular edge between the prismatic faces $f_A$ and $s_A$ as well as between $f_B$ and $s_B$ has to avoid excessive tensile stresses. The intermediate spaces between the rib faces $f_A$ and $f_B$ and, if present, between the rib faces sA and sB have to be carefully sealed to the environmental air in order to safely and durably prevent the intrusion of dust and moistness.

Manufacturing of Suitable Reflective Coatings for the Rib Face $s_A$

A1 (evaporating of aluminum or silver): A specularly reflecting coating of aluminum or silver which is sealed with an appropriate protecting layer is evaporated to the rib face $s_A$. The reflectance for internal reflections at the rib face $s_A$ is about 0.90 (aluminum) or 0.94 (silver), respectively. Providing an appropriate sealing the reflective properties of the evaporated aluminum and silver, respectively, are extremely durable, i.e. even if long periods of time are considered, the solar radiation does not change the reflectance.

A2 (bonding of an aluminum foil or an aluminum sheet with polished surface): A specularly reflecting aluminum foil or a thin, specularly reflecting aluminum sheet with polished surface is bonded to the rib face $s_A$. The adhesive has to be clear and is to be applied without blisters. The chemical compatibility of the adhesive in accordance to the glass and the foil or the sheet, respectively, the adhesive strength of the adhesive in accordance to the glass and the foil or the sheet, respectively, and the durability of the adhesive referring to solar irradiation is to be investigated and to be secured. The reflectance of internal reflections at the rib face $s_A$ is about 0.90. Providing an appropriate sealing the reflective properties of the aluminum foil or the aluminum sheet, respectively, are—as for variant A1—extremely durable.

Manufacturing of Suitable Reflective Coatings for the Rib Face $s_B$

B1 (coating of a white paint): The rib face $s_B$ is coated with a diffusely reflecting white paint. A dull, genuine white paint has to be chosen. Zinc oxide or zirconium sulfate is a preferable pigment of the white paint. The chemical compatibility of the paint and the glass, the adhesion of the paint to the glass and the durability of the reflective properties of the paint referring to solar irradiation is to be investigated and to be secured. With such a paint a reflectance of 0.80 to 0.86 (diffuse) during the lifetime of a window has to be accomplished.

B2 (coating of a white adhesive): This variant complies with the variant B1 with the exception that the white paint is replaced by an adhesive filled with a white pigment. E.g. thin sheets of aluminum can be bonded with a covering layer of adhesive without blisters to the prismatic face $s_B$.

B3 (bonding of a thin sheet of aluminum with anodized surface): The anodizing of thin sheets of aluminum is performed in an electrolytic liquid of 15 per cent sulfuric acid at 21° C. and a dc-current density of 0.027 A/cm$^2$ up to a layer thickness of about 13$\mu$. The diffusely reflecting sheet of aluminum is bonded with the anodized surface to the rib face $s_B$. The adhesive has to be clear like glass and is to be applied without containing blisters. The chemical compatibility of the adhesive with the glass and the aluminum sheet and the durability of the adhesive referring to solar irradiation is to be investigated and to be secured. The reflectance for internal reflections at the rib face $s_B$ is about 0.85. The reflective properties of the anodized aluminum sheet are extremely durable.

Embodiment a

Figure 32:
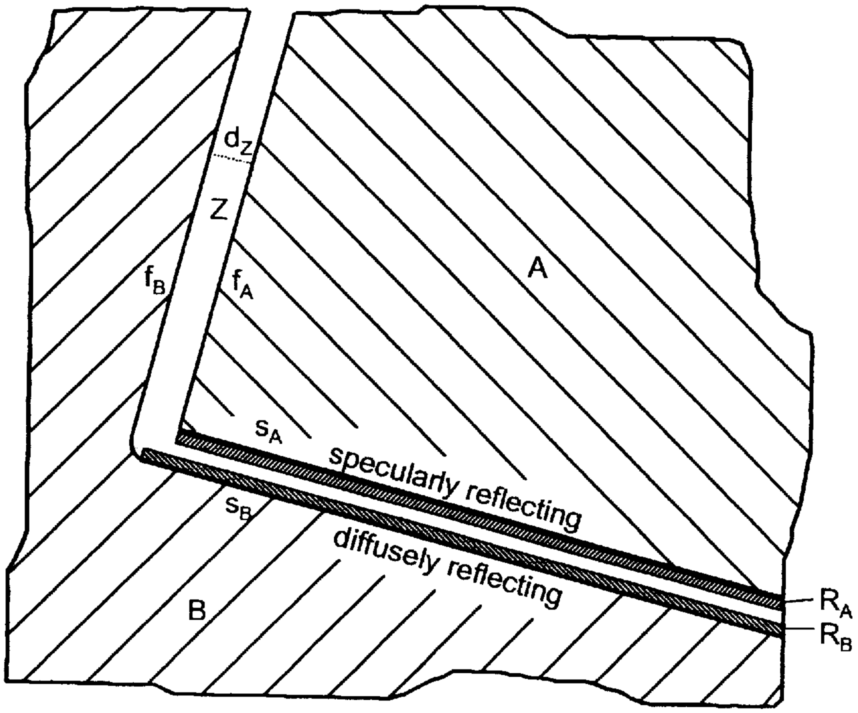

FIG. 32 presents a detail of the rib cross-section of the embodiment a. The reflective layers $R_A$ and $R_B$, respectively, of the rib faces $s_A$ and $s_B$, respectively, can alternatively be realized by all described methods A1 or A2 and B1, B2 or B3, respectively. There is a gap between the rib faces $s_A$ and $s_B$. The mechanical connection between both prismatic panes A and B is performed by an edge junction, as it is applied for common isolating panes, too. The gaps between the rib faces $f_A$ and $f_B$ and between the rib faces $s_A$ and $s_B$ are set by separating sheets at the pane edges. The desired low gaps widths which are to be retained for all occurring environmental conditions and the required mechanical stability of the system are accomplished by a corresponding constructional design. These requirements cause rather thick panes for this system. The bigger the dimensions of a single window area are, the thicker the panes of this systems have to be.

Embodiment b

Figure 33:
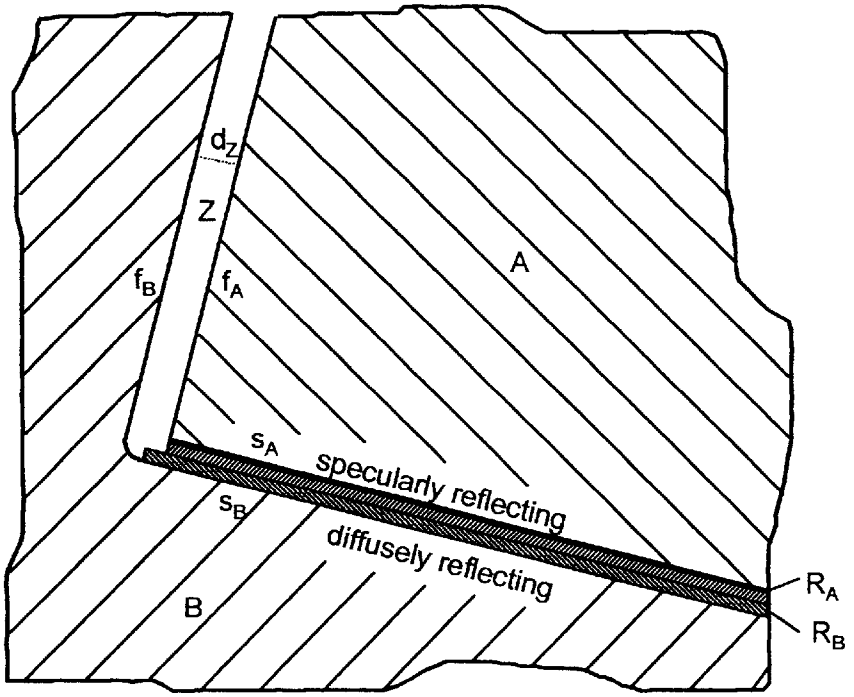
FIG. 33 presents constructive details of design b

FIG. 33 presents a detail of the rib cross-section of the embodiment b. The reflective layer $R_A$ of the rib face $s_A$ can be realized by the method A1, whereas the reflective layer $R_B$ of the rib face $s_B$ can be manufactured by the method B2. The white adhesive works as the reflective layer $R_B$ and, moreover, establishes a firm bonding connection between the rib $s_A$ and $s_B$. It has to be investigated, if the adhesive strength of the evaporated aluminum layer $R_A$ on the rib face $s_A$ is sufficient to resist minor tensile stresses. The mechanical connection between both prismatic panes A and B is additionally achieved by an edge junction. The gap width $d_Z$ between the rib faces $f_A$ and $f_B$ and the thickness of the adhesive layer between the rib faces $s_A$ and $s_B$ are either set by separating sheets at the pane edges or by a special manufacturing tool which keeps the two prismatic panes A and B accurately in position during the hardening process of the adhesive. In spite of relatively thin panes in this way the desired low gap widths and the required mechanical stability of the system are accomplished for all occurring environmental conditions and are independent on the size of the window area.

Embodiment c

Figure 34:
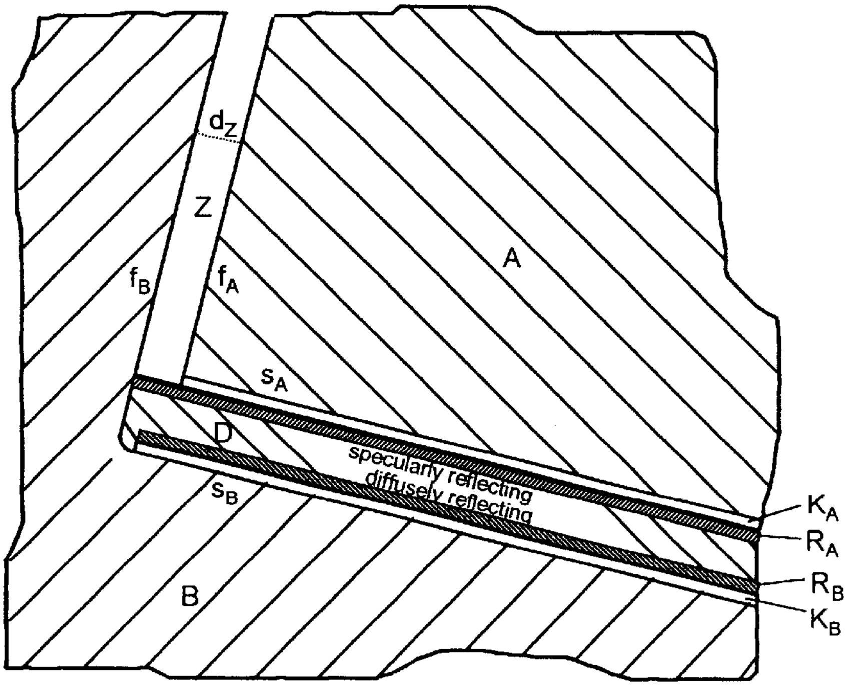
FIG. 34 presents constructive details of design c

FIG. 34 presents a detail of the rib cross-section of the embodiment c. A thin sheet of aluminum D the polished surface of which (reflective layer $R_A$) is specularly reflecting and the other anodized surface of which (reflective layer $R_B$) is diffusely reflecting is bonded with two layers of clear, durable adhesive ($K_A$ and $K_B$) between the rib faces $s_A$ and $s_B$. Thus the methods A2 and B3 are applied for the manufacturing of the reflective layers. The aluminum sheet D with a thickness of, for instance, $d_D$=0.4 mm is by the width $d_Z$ of the gap Z wider than $s_A$ or $s_B$—e.g. $d_Z$=0.4 mm—that, therefore, D determines the gap width between the rib faces $f_A$ and $f_B$. In this way specifically narrow and constant gaps Z along the length of the prismatic ribs can be realized with relatively simple manufacturing tools and separating sheets at the pane edges are not required. At the small sides of the aluminum sheet D, where it is in contact with the rib face $f_A$ and $f_B$, respectively, 45°-faces avoid the development of excessive tensile stresses in the rounded edges between the rib face $f_A$ and the rib face $s_A$ and, respectively, between the rib face $f_B$ and the rib face $s_B$. For equal pane dimensions the mechanical stability of this system corresponds to the mechanical stability of the system of embodiment b.

Embodiment d

Figure 35:
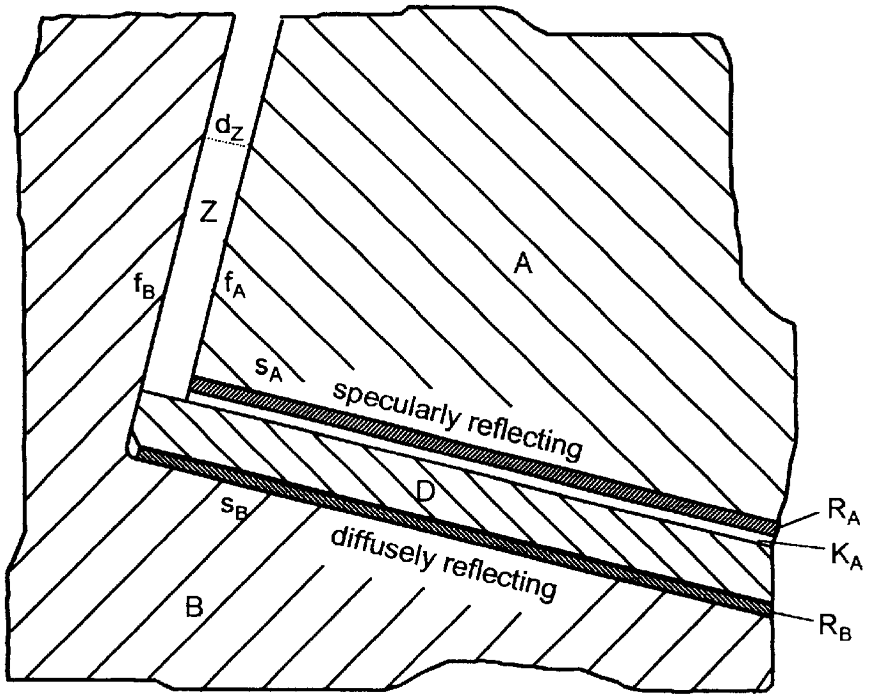
FIG. 35 presents constructive details of design d.

FIG. 35 presents a detail of the rib cross-section of the embodiment d. This system is a combination of the embodiment b and the embodiment c, i.e. the reflective layers $R_A$ and $R_B$ are made as for embodiment b and the aluminum sheet D determines the gap width between the rib faces. According to the simplicity and the precision of the manufacturing and to the mechanical stability of the system the same statements hold as for embodiment c.

I claim:

1. A pane system of a window which separates an internal room from an external environment and consists of an outer pane A and an inner pane B of transparent material each of which are bounded by a plane surface $a_A$ or $a_B$, respectively, and by a surface consisting of a plurality of parallel, prismatic ribs positioned one upon another, where the window is vertical or is inclined by a window inclination angle $\nu$ relative to the horizontal plane and deviates with its direction by a window direction angle $\Delta\beta$ from the south on the northern hemisphere or from the north on the southern hemisphere, respectively, where all ribs have identical cross-sections in the shape of a right-angle triangle and the ribs of the pane A and the pane B are facing each other and are interlocking in such a way that just a small gap remains between both of the panes, where the plane surfaces $a_A$ and $a_B$ are parallel to each other and the plane surface $a_A$ is directed to the external environment and the plane surface $a_B$ is directed to the internal room, where the ribs of the pane A and, respectively, of the pane B are bounded by a lower rib face $s_A$ and an upper rib face $f_A$ and, respectively, an upper rib face $s_B$ and a lower rib face $f_B$, where the rib faces $s_A$ relative to the surface $a_A$ and, respectively, the rib faces $s_B$ relative to the surface $a_B$ form a basic prism angle θ and the rib faces $f_A$ relative to the surface $a_A$ and, respectively, the rib faces $f_B$ relative to the surface $a_B$ form the other basic prism angle Ω, wherein the improvement comprises that the rib faces $s_A$ are coated with layers $R_A$ specularly reflecting to the interior of the pane A and the rib faces $s_B$ are coated with layers $R_B$ diffusely reflecting to the interior of the pane B, that the inclination angle α of the longitudinal axes of the prismatic ribs relative to the horizontal within the window plane is determined by $$\tan\alpha = -\sin\Delta\beta/(\cos\Delta\beta\cdot\cos\nu + \tan\lambda\cdot\sin\nu)$$

with the window direction angle Δβ within the range $-75° \leqq \Delta\beta \leqq 75°$, the window inclination angle ν within the range $45° \leqq \nu \leqq 90°$ and the geographical latitude λ of the application site of the pane system within the temperate climate of the range $30° \leqq \lambda \leqq 60°$ of northern and southern latitude and that the basic prism angle θ is determined by $$\theta = \pi/2 - \kappa + \arcsin\{1/n\cdot\sin[\delta_0\cdot\cos(2\pi\cdot d_G/d_J) + \zeta_0]\}$$

with $d_G$: the solar blockade period in days as well before as after the summer solstice during which no direct solar radiation is to penetrate the prismatic pane system, $d_J$=365.25 days, the period of a year, κ=arcsin(1/n), the critical angle of total internal reflection, with n: the refractive index of the pane material which is about 1.5 for common window glass and acrylic glass, $\zeta_0 = \arctan(z_{0\nu}/x_{0\nu})$, the rib elevation angle of the solar radiation vector, when the solar radiation vector is within the equator plane and within the cross-sectional area of the rib, that is the angle between the normal of the surface $a_A$ and the solar radiation vector at the equinoxes with the solar declination angle δ=0° and at the mean solar daytime $t_\nu$ of the application site or, respectively, for the daytime angle $\beta_\nu = \pi/12\ h\cdot t_\nu$ with $$x_{0\nu} = -C\cdot\sin\nu - \cos\beta_\nu\cdot\cos\lambda\cdot\cos\nu$$

$$z_{0\nu} = -D\cdot\sin\alpha + (C\cdot\cos\nu - \cos\beta_\nu\cdot\cos\lambda\cdot\sin\nu)\cdot\cos\alpha$$

with $\beta_\nu = \arctan\{[E\cdot(\sin\lambda\cdot\cos\Delta\beta\cdot\cos\lambda\cdot\tan\nu) - \sin\lambda\cdot\tan\Delta\beta]/(1+E\cdot\sin\Delta\beta)\}$ $C = (\cos\beta_\nu\cdot\sin\lambda\cdot\cos\Delta\beta - \sin\beta_\nu\cdot\sin\Delta\beta)$ $D = (\cos\beta_\nu\cdot\sin\lambda\sin\Delta\beta + \sin\beta_\nu\cdot\cos\Delta\beta)$ $E = \tan\Delta\beta/(\cos\Delta\beta + \tan\lambda\cdot\tan\nu)$ and $\delta_0$=23.45°, the maximum solar declination angle of the solar radiation vector relative to the equator plane at the summer solstice.

2. The pane of claim 1 wherein:

the basic prism angle θ is chosen within the ranges $45° \leqq \theta \leqq (2\kappa + \pi/2)/3$, $(\kappa + \zeta_{M1} + 3/2\pi)/5 \leqq \theta \leqq (2\kappa + 3/2\pi)/5$ and $(\kappa + \zeta_{M1} + 5/2\pi)/7 \leqq \theta \leqq (2\kappa + 5/2\pi)/7$ with $\zeta_{M1} = \arcsin[1/n\cdot\sin(\delta_0 + \zeta_0)]$ or, respectively, with the refractive index n=1.5 of common window glass and acrylic glass the basic prism angle θ is chosen within the ranges $45° \leqq \theta \leqq 58°$, $68° \leqq \theta \leqq 71°$ and $74° \leqq \theta \leqq 77°$, because during the solar blockade period even indirect solar radiation diffusely reflected at the rib faces $s_B$ is not or nearly not transmitted by the pane system with basic prism angles in these ranges.

3. The pane of claim 1 wherein:

the specularly reflecting layers $R_A$ of the rib faces $s_A$ are manufactured by evaporating of aluminum or silver and sealing of these metallic layers by protecting covering layers or bonding of specularly reflecting aluminum foils or thin, specularly reflecting aluminum sheets with a dear adhesive, the diffusely reflecting layers $R_B$ of the rib faces $s_B$ are generated by coating of a dull, white paint or bonding of thin aluminum sheets with anodized, diffusely reflecting surfaces employing a clear adhesive and there are gaps Z between the rib faces $f_A$ and $f_B$ and the reflecting layers $R_A$ and $R_B$ which are fixed by thin gap keeping sheets at the pane edges so that the gaps are as narrow as possible, but are safely and durably present.

4. The pane of claim 1 wherein:

the specularly reflecting layers $R_A$ of the rib faces $s_A$ are manufactured by evaporating of aluminum or silver and sealing of these metallic layers by protecting covering layers, the diffusely reflecting layers $R_B$ of the rib faces $s_B$ are generated by an adhesive $K_B$ filled with a white pigment which tightly bonds the layers $R_A$ of the rib faces $s_A$ to the rib faces $s_B$ with a covering adhesive layer without blisters and the bonding is performed such that the gaps Z between the rib faces $f_A$ and $f_B$ are as narrow as possible, but are safely and durably present.

5. The pane of claim 1 wherein:

the specularly reflecting layers $R_A$ of the rib faces $s_A$ are manufactured by bonding of specularly reflecting aluminum foils or thin, specularly reflecting aluminum sheets D with a clear adhesive $K_A$, the diffusely reflecting layers $R_B$ of the rib faces $s_B$ are generated by bonding the rear, anodized, diffusely reflecting surfaces of the thin aluminum sheets D to the rib faces $s_B$ employing a dear adhesive $K_B$ and the thin aluminum sheets D are wider by the width $d_Z$ of the gaps Z between the rib faces $f_A$ and $f_B$ than the rib faces $s_A$ and $s_B$ and, thus, work as gap keeping elements between the rib faces $f_A$ and $f_B$ and cause constant narrow gaps Z.

6. The pane of claim 1 wherein:

thin aluminum sheets D which are wider by the width $d_Z$ of the gaps Z between the rib faces $f_A$ and $f_B$ than the rib faces $s_A$ and $s_B$ are laid between the rib faces $s_A$ and $s_B$ and work as gap keeping elements between the rib faces $f_A$ and $f_B$ and cause constant narrow gaps Z, the specularly reflecting layers $R_A$ of the rib faces $s_A$ are manufactured by evaporating of aluminum or silver and sealing of these metallic layers by protecting covering layers and are tightly bonded to the thin aluminum sheets D with a clear adhesive $K_A$ and the diffusely reflecting layers $R_B$ of the rib faces $s_B$ are generated by an adhesive $K_B$ filled with a white pigment which tightly bonds the thin aluminum sheets D to the rib faces $s_B$ with a covering adhesive layer without blisters.

* * * * *